United States Patent [19]
Hafel

[11] 3,947,976
[45] Apr. 6, 1976

[54] MATHEMATICAL PROBLEM AND NUMBER GENERATING SYSTEMS

[75] Inventor: William R. Hafel, Sunnyvale, Calif.

[73] Assignee: Eric F. Burtis, Redwood City, Calif.

[22] Filed: Mar. 10, 1975

[21] Appl. No.: 556,981

[52] U.S. Cl. ................................. 35/31 C; 331/78
[51] Int. Cl.² ......................................... G09B 19/02
[58] Field of Search ............ 35/9 R, 9 A, 9 B, 31 C; 273/138 A, 139; 313/217; 315/167; 331/78

[56] References Cited
UNITED STATES PATENTS

| | | | |
|---|---|---|---|
| 3,439,281 | 4/1969 | McGuire et al. | 273/138 A X |
| 3,445,591 | 5/1969 | Koehler et al. | 331/78 X |
| 3,505,746 | 4/1970 | Jackson | 35/9 R |
| 3,584,398 | 6/1971 | Meyer et al. | 35/31 C |
| 3,612,845 | 10/1971 | Lawlor | 331/78 X |
| 3,673,707 | 7/1972 | Manning | 35/31 C X |
| 3,694,693 | 9/1972 | Holz | 313/517 X |
| 3,787,988 | 1/1974 | Nakajima et al. | 35/31 R |
| 3,803,589 | 4/1974 | Hatsukano et al. | 273/138 A X |
| 3,849,694 | 11/1974 | Harvey et al. | 313/217 X |
| 3,866,128 | 2/1975 | Fletcher et al. | 331/78 X |

*Primary Examiner*—Wm. H. Grieb
*Attorney, Agent, or Firm*—Benoit Law Corporation

[57] ABSTRACT

Apparatus for deriving two output numbers generate a first number and provide a second number having a plurality of digit places by subjecting the first number to a predetermined mathematical operation, and derive one of the two desired output numbers from a first digit place of the second number and the other of the two desired output numbers from a different second digit place of the second number.

8 Claims, 20 Drawing Figures

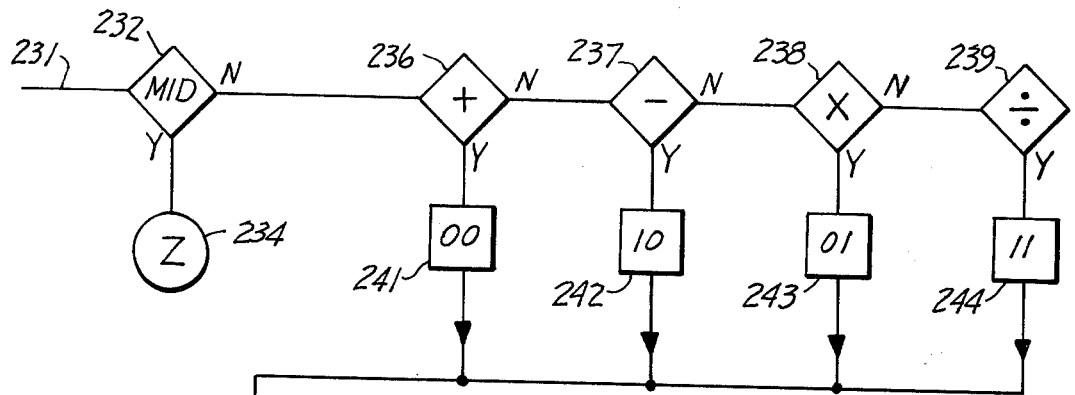
Fig.7
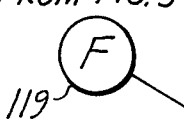
Fig.19
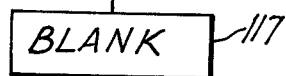
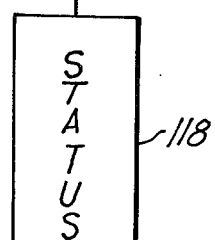
Fig.20

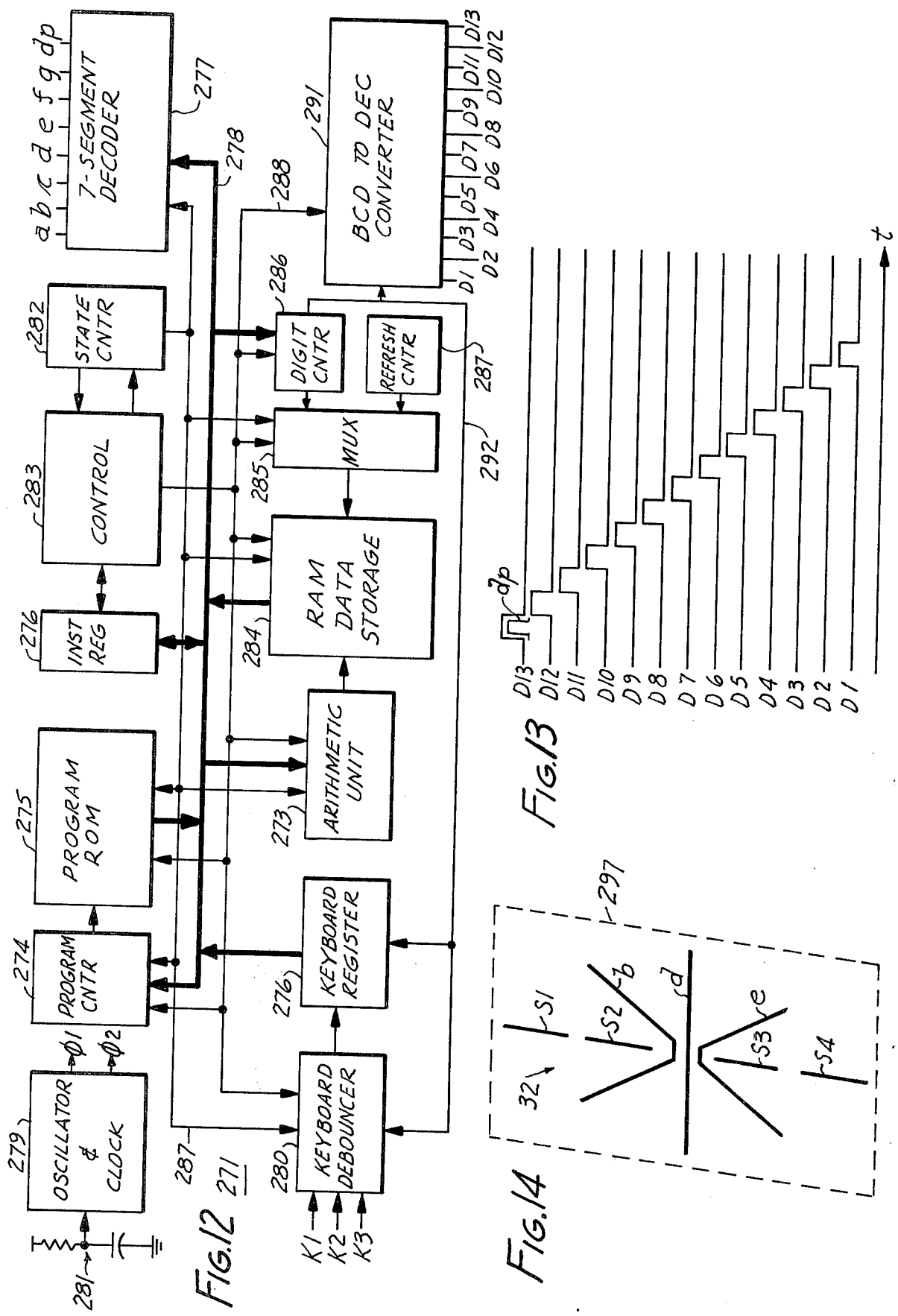

MATHEMATICAL PROBLEM AND NUMBER GENERATING SYSTEMS

CROSS-REFERENCE TO RELATED APPLICATIONS

Subject matter herein disclosed is disclosed and claimed in the following copending patent applications, assigned with the instant application to a common assignee, filed of even date herewith and herewith incorporated by reference herein:

Ser. No. 557,007, to James E Kinzie;
Ser. No. 557,131, to Ming T. Lien;
Ser. No. 557,132, to Eric F. Burtis et al.

BACKGROUND OF THE INVENTION

1. Field of the Invention

The subject invention relates to number generating equipment and has utility in mathematical problem generating apparatus and other systems. A specific field of utility is the arithmetic teaching machine area.

2. Description of the Prior Art

Existing equipment for providing two or more numbers for arithmetic teaching apparatus, mathematical problem generating means and other equipment is relatively expensive and cumbersome in its operation, thereby placing the resulting apparatus out of the reach of many pupils, their parents, or school systems.

SUMMARY OF THE INVENTION

It is broadly an object of this invention to overcome the above mentioned disadvantages.

It is a related object of this invention to provide improved apparatus for generating two numbers.

It is a further object of this invention to provide improved apparatus for generating mathematical problems.

Other objects of the invention will become apparent in the further course of this disclosure.

From a first aspect thereof, this invention resides in apparatus for deriving two output numbers comprising, in combination, means for providing a first number, means connected to said first number providing means for providing a second number having a plurality of digit places, by subjecting said first number to a predetermined mathematical operation, means connected to said second number providing means for deriving one of said two output numbers from a first digit place of said second number, and the other of said two output numbers from a different second digit place of said second number.

From another aspect thereof, the invention resides in apparatus for generating mathematical problems and, more specifically, resides in the improvement comprising, in combination, means for providing a first number, means connected to said first number providing means for providing a second number having a plurality of digit places, by subjecting said first number to a predetermined mathematical operation, means connected to said second number providing means for deriving one of two output numbers from a first digit place of said second number, and the other of said two numbers from a different second digit place of said second number, and means connected to said deriving means for presenting a mathematical problem including said one and said other derived output numbers.

BRIEF DESCRIPTION OF THE DRAWINGS

The invention and its various aspects as well as the setting thereof, will become more readily apparent from the following detailed description of preferred embodiments thereof, illustrated by way of example in the accompanying drawings, in which like reference numerals designate like or functionally equivalent parts, and in which:

FIG. 3 to 7 constitute a micro flow chart of a preferred embodiment of the subject invention;

FIG. 12 is a block diagram of a calculator employed in the apparatus of FIG. 9;

FIG. 13 illustrates waveforms of signals occurring in the apparatus of FIGS. 9 and 12;

FIG. 14 is an elevation of a display electrode arrangement in accordance with a preferred embodiment, that may be employed at 14 in FIG. 10;

FIG. 19 shows how the sheets 3 to 7 are to be juxtaposed; and

FIG. 20 shows how the sheets 8 to 11 are to be juxtaposed.

DESCRIPTION OF PREFERRED EMBODIMENTS

Figure 1:
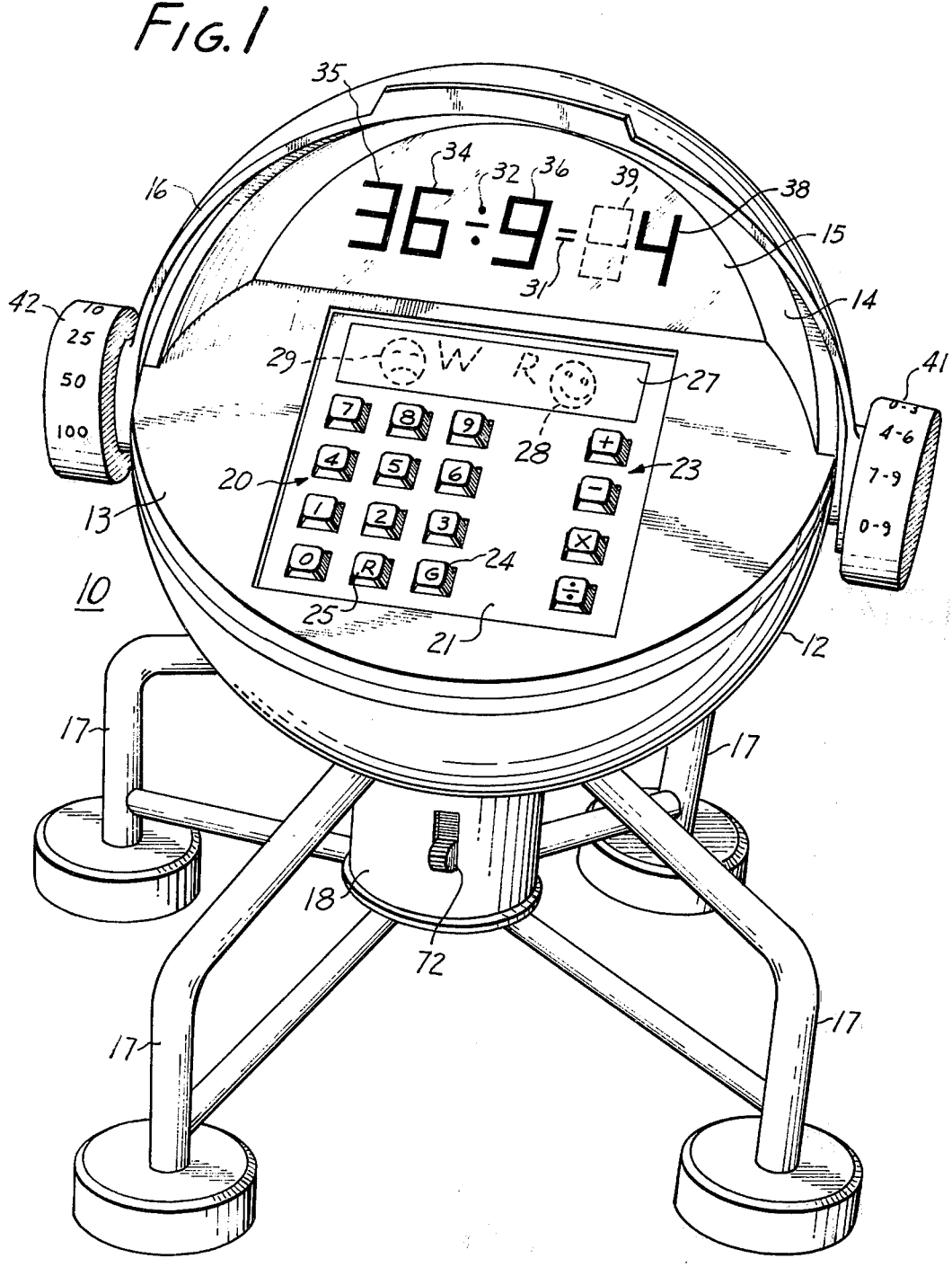
FIG. 1 is a perspective view of an arithmetic teaching apparatus which may implement the subject invention.

The arithmetic teaching apparatus shown in the drawings is akin to the teaching device disclosed in U.S. Pat. No. 3,584,398, by J. C. Meyer et al., issued June 15, 1971, and herewith incorporated by reference herein. In some respects, the teaching apparatus shown in the drawings may be viewed as a further development of, and improvement on, the teaching device disclosed in the latter incorporated patent.

The invention herein disclosed is, of course, not dependent on any particular shape or form of teaching apparatus, but may be practiced broadly in different contexts and equipment. However, a comprehension of the invention is believed to be facilitated by the disclosure of a specific apparatus in a particular form and with certain components to which reference may be had in the further course of this disclosure.

Accordingly, a preferred form of teaching apparatus 10 is shown in FIG. 1 for illustrative purposes.

The teaching apparatus 10 of FIG. 1 has an essentially spherical or spheroid housing 12 which defines a console 13 and a canopy 14 for a display panel 15.

The teaching apparatus 10 has a transparent visor 16, shown in its upper position. The visor may be lowered to cover the console 13 and display panel 15 when not in use. The housing 12 is supported by leg structures 17. A central cylindrical structure below the housing 12 may serve as an ornamental feature, as a container for electrical batteries or for any other desired purpose.

A set of number keys 20, running from 0 to 9, is located on a panel 21 mounted within the console 13. A set of arithmetic function keys 23 is also mounted on the panel 21. Two further keys on the panel 21 include a start or go key 24 and a reset key 25.

The mounting panel 21 also mounts a further display panel which indicates to the pupil whether his answer was correct. To this end, the panel 27 may display a happy face 28 when the answer was correct, or a sad face 29 when the answer was incorrect. A suitable legend such as "right" or R may accompany the happy face 28 or may be employed in lieu thereof. Similarly, a suitable legend, such as "wrong" or W, may accompany the sad face 29 or be employed in lieu thereof.

The display panel 15 may be of any suitable type to display mathematical problems and their answers. Typically, the display panel 15 will display an equal sign 31 and an arithmetic function sign 32 corresponding to the arithmetic function selected by the pupil at the time with the function keys 23.

The display panel 15 is also capable of displaying one or more digits 34 and 35 as an addend in an arithmetic addition problem, as the minuend in an arithmetic subtraction problem, as a factor in an arithmetic multiplication problem, or as the dividend in an arithmetic division problem.

The display panel 15 is also capable of displaying at least one further digit 36 which may also be an addend in an arithmetic addition problem, the subtrahend in an arithmetic subtraction problem, a factor in an arithmetic multiplication problem, or the divisor in an arithmetic division problem.

The display panel is, moreover, capable of displaying the correct answers with the aid of at least two digits, one of which is shown in solid outline at 38 and the other of which is shown in phantom outline at 39.

Further equipment of the teaching apparatus 10 includes a rotatable knob 41 which permits the pupil to select a desired difficulty level, and a rotatable knob 42 which enables the student to select the number of problems he wishes to be presented in a given test run or scoring cycle.

Figure 2:
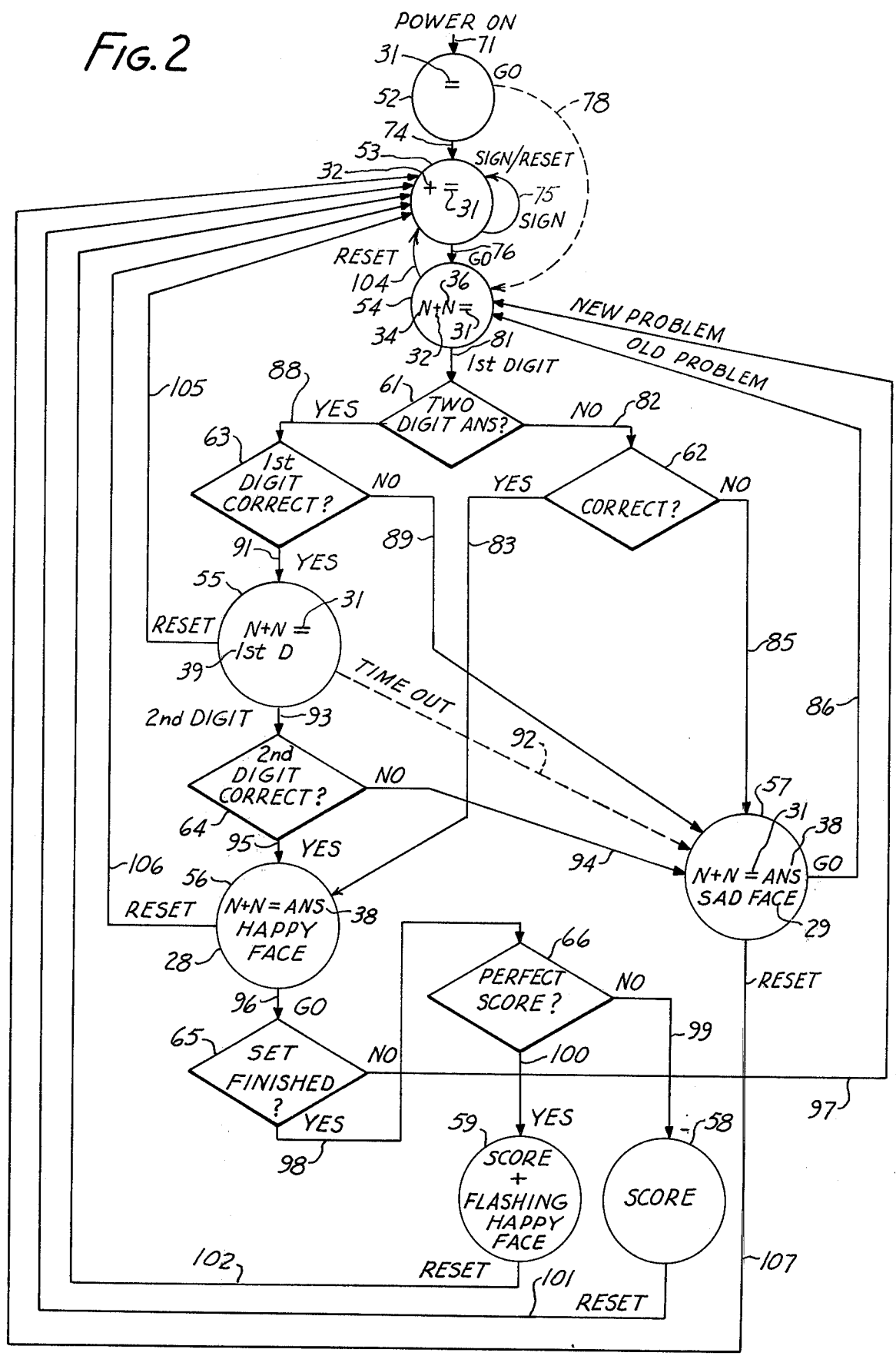
FIG. 2 is a flow diagram of a preferred operation of the teaching apparatus herein disclosed.

A possible and preferred operation of the teaching apparatus 10 will now be disclosed with reference to the macro flow diagram shown in FIG. 2.

In particular, the macro flow diagram of FIG. 2 discloses eight externally discernible states with the aid of a series of circles 52, 53, 54, 55, 56, 57, 58, and 59, and six externally discernible test functions, each calling for a Yes or No answer, by a series of diamonds 61, 62, 63, 64, 65 and 66.

As indicated by the arrow 71 in FIG. 2, a "power on" condition leads to the state 52. In practical terms, the power on condition may be effected by actuation of an on-off switch, such as the switch 72 shown in FIG. 1, to the "on" condition.

In order to signal the readiness of the teaching apparatus to the pupil, the equal sign 31 is displayed in the power on state 52. At this juncture, the pupil may set the knob 41 to the desired difficulty level and the knob 42 to the number of questions the pupil desires to be presented with in the impending test run or scoring cycle.

The pupil will then normally depress that one of the keys 23 that represents the arithmetic function he desires to be tested on in the particular cycle (the pronoun "he" and other expressions of male connotation are herein intended to cover also the female gender).

The teaching apparatus having thus been transferred from the state 52 to the state 53, the selected arithmetic sign 32 is displayed to the pupil. As an optional matter of convenience, the teaching apparatus may also be transferred from the state 52 to the state 53 if the pupil depresses the reset button 25. Where that option is provided, the teaching apparatus is preferably set to display a given arithmetic sign, such as the plus sign, when the reset button 25 is depressed to transfer the apparatus from the state 52 to the state 53.

A further optional feature is indicated by the arrow 75, according to which the arithmetic sign may be changed during the state 53 by actuation of the desired arithmetic function key 23. Actuation of any function key 23 which causes a change in the displayed sign will also change the arithmetic function in accordance with the changed sign.

Pursuant to the arrows 76, the pupil may now transfer the teaching apparatus from the state 53 to the state 54 by actuation of the start or go key 24. In the state 54, the apparatus displays to the pupil the first problem of the particular testing cycle by adding to the display of the signs 31 and 32 further digits, such as digits 34 and 36, serving as addends in an arithmetic addition problem, as factors in an arithmetic multiplication problem, as minuend and subtrahend in an arithmetic subtraction problem, or as dividend and divisor in an arithmetic division problem.

The digits 34 to 36 may be randomly selected by the apparatus in the manner hereinafter described.

As an optional matter of convenience, the teaching apparatus may be directly transferrable from the state 52 to the state 54 as indicated by the dotted arrow 78 in response to a depression of the go key 24 when the apparatus is in the state 52. In that case, the apparatus is preferably set to display a problem of a particular kind, such as an addition problem, when the go key 24 is depressed while the apparatus is in the state 52 and is thereby transferred directly to the state 54.

Display of the problem in state 54 will challenge the student to indicate an answer by actuation of the appropriate key or keys 20. As indicated by the arrow 81 in FIG. 2, actuation of one of the answer keys 20 in the case of a problem calling for a one-digit answer, or actuation of the first answer key in the case of a problem calling for a two-digit answer, will advance the apparatus from the state 54 to the test function 61. The purpose of the function 61 is to test whether or not the displayed problem calls for a two-digit answer. To this end, the apparatus will have calculated the result of the displayed problem, such as in the manner hereinafter described, and will then determine in the function 61 whether the particular answer is composed of one or two digits.

As indicated by the arrow 82 in FIG. 2, the apparatus will proceed from the function 61 to the test function 62 if the test function 61 has determined that the displayed problem does not call for a two-digit answer.

The test function 62 then determines whether the answer supplied by the pupil by the depression of one of the answer keys 20 was correct. This may be done by comparing the value input by the pupil to the result calculated by the teaching apparatus.

As indicated by the arrow 83, the apparatus advances from the test function 62 to the state 56 if the pupil has supplied the correct answer. In that case, the apparatus adds to the display of the problem a digit 38 representing the correct answer. In addition, the apparatus displays on the panel 27 shown in FIG. 1 a happy face 28 or other indicia indicating to the pupil that his answer was correct.

On the other hand, if the pupil supplies an incorrect answer, the apparatus will go from the function 62 to the state 57, as indicated by the arrow 85 in FIG. 2. In that case, the apparatus displays on the panel 27 a sad face 29 or other indicia indicating to the pupil that his answer was wrong. In addition, the apparatus may then also display to the student the correct answer 38. In principle, the apparatus could display to the pupil the wrong answer which he actually provided. However, it is presently believed to be pedagogically more advantageous if the correct answer, rather than a wrong answer, is displayed, since it is feared that the pupil may otherwise come to memorize the wrong answer.

As indicated by the arrow 86, the pupil may then actuate the go button 24 to transfer the apparatus from the state 57 back to the state 54 for a repeated display of the problem to which he supplied a wrong answer.

In principle, it is within the scope of the subject invention that a transfer from the state 57 to the state 54 will result in a display of a new problem. However, it is believed pedagogically more advantageous if the old problem is redisplayed until the pupil has answered it correctly.

The apparatus having been returned to the state 54, the test function and answer cycle will be repeated, as will the display of the sad face 29 and of the correct answer 38 and the redisplay of the old problem at 54, until the student has supplied a correct answer. In that case, the apparatus will proceed from the test function 62 to the state 56 as indicated by the arrow 83 and as described above.

As indicated by the arrow 88, the apparatus will proceed from the function 61 to the function 63 if the test function 61 determines that a particular problem displayed in the state 54 calls for a two-digit answer. The test function 63 determines whether the first digit of the answer as input by the student by actuation of the appropriate answer key 20 is correct. If the apparatus determines that the pupil has actuated the wrong answer key, then the apparatus proceeds directly from the test function 63 to the state 57 as indicated by the arrow 89. In this manner, the apparatus saves the pupil's time by indicating to him that his answer was incorrect before the pupil has input the second digit of the two-digit answer.

On the other hand, if the test function 63 determines that the pupil actuated the correct answer key 20 in inputting the first digit of his two-digit answer, the apparatus proceeds from the function 63 to the state 55, as indicated by the arrow 91. In state 55 the correct first digit is displayed along with the problem, such as the position 39 shown in FIG. 1. This is an important feature of the subject apparatus since it will urge and encourage the student to input the second digit of the answer, typically after a mental verification of the correct response. This has been found to be of great help in the teaching process and in the results achieved by the subject apparatus.

In state 55, the apparatus awaits the pupil's keying in of the second digit of the two-digit answer. In principle, it is within the broad contemplation of the invention that the apparatus wait for an indefinite time for the entering of the second digit by the student. However, it is preferred for pedagogical and practical reasons that the student be given only a limited time, such as in the neighborhood of about 10 seconds, for entering the second digit. Accordingly, as indicated by the dotted arrow 92 in FIG. 2, the apparatus will proceed from the state 55 to the state 57 when the pupil fails to key in the second digit within the allotted time. In other words, the pupil's answer is considered and is displayed as incorrect if his entry of the first digit is not promptly followed by an entry of the second digit. Having thus arrived at a wrong answer display, the pupil may return the apparatus from the state 57 to the state 54 in the above mentioned manner and as indicated by the arrow 86 by depressing the go key 24.

On the other hand, if the pupil depresses a further answer key 20 within the allotted time, the apparatus proceeds from the state 55 to the function 64 as indicated by the arrow 93. The function 64 determines whether the second digit supplied by the pupil is correct. If not, the apparatus proceeds from the function 64 to the sad face state 57 as indicated by the arrow 94, and the pupil may then again actuate the go button 24 for returning the apparatus to the problem display state 54.

On the other hand, if the test function 64 determines that the second digit supplied by the pupil is also correct, then the apparatus proceeds to the happy face state 56, as indicated by the arrow 95. In that state, the correct answer 38 and 39 and the happy face 28 will be displayed.

The pupil may then depress the go button 24 so that the apparatus will proceed from the state 56 to the function 65 as indicated by the arrow 96. The test function 65 determines whether the last-displayed correct answer is in fact the last answer in a given set. In this respect, and by way of example, sets of 10, 25, 50 or 100 questions each may be preselected by the pupil by an appropriate setting of the knob 42 shown in FIG. 1.

If the test function 65 determines that the particular set is not finished, the apparatus returns from the function 65 to the condition 54 as indicated by the arrow 97.

In contrast to the transfer indicated by the arrow 86, the transfer designated by the arrow 97 includes the presentation of a new problem on the display screen 15. This presentation of a new problem may involve the random selection of two new numbers 34 and 36 by the apparatus. The advance of the apparatus then proceeds via the arrow 81 as described above in connection with the previously displayed problem.

When the test function 65 determines that a particular correctly answered problem was the last problem in the particular set, the apparatus may then display or otherwise indicate the score for that set to the pupil in the manner disclosed in the above mentioned U.S. Pat. No. 3,584,398, or in any other desired fashion. By way of example, the apparatus herein disclosed includes a presently preferred refinement.

In particular, the apparatus is advanced from the function 65 to the function 66, as indicated by the arrow 98, if the test function 65 determines that a correctly answered question was the last problem in a given set. The test function 66 then determines whether or not the pupil has a perfect score for the particular set; that is, whether the pupil answered all of the problems of the particular set correctly the first time each problem was presented.

To this end, the apparatus will keep score of each answered question and make the determination at the end of the particular set.

If the test function 66 determines that the pupil has a less than perfect score for the particular set, the apparatus will proceed to the state 58, as indicated by the arrow 99. In the state 58, the score will be displayed or otherwise indicated to the pupil. For instance, the digit positions 38 and 39 on the display panel 15 may be employed to display the test score to the pupil. For instance, if the pupil answered eight out of ten questions correctly at the first try, the position 38 may display a figure 8.

Conversely, if the test function 66 determines a perfect score for the particular set, the apparatus advances from the function 66 to the state 59, as indicated by the arrow 100. In the state 59, the score is displayed (such as a figure 10 if the pupil answered all ten problems of a 10-problem set correctly). Optionally, the happy face 28 flashes in the state 59, so as to reward the pupil for a perfect score by way of encouragement for further educational exploits.

As indicated by the arrows 101 and 102, the apparatus may be reset to the above mentioned state 53 from either the condition 58 or the condition 59 so that a new set of problems may then be started. Moreover, the illustrated apparatus includes the possibility of terminating a set prior to its completion and of starting a new set at that time. By way of example, this possibility exists at the state 54 as indicated by the arrow 104, at the state 55 as indicated by the arrow 105, at the state 56 as indicated by the arrow 105, at the state 56 as indicated by the arrow 106 and at the state 57 as indicated by the arrow 107. All these reset functions are typically effected by depression of the reset key 25 shown in FIG. 1.

In addition to the macro flow diagram shown in FIG. 2, a micro flow chart shown in FIGS. 3 to 7 of a preferred embodiment of the invention will now be considered before reference is made to the hardware of the system.

Figure 3:
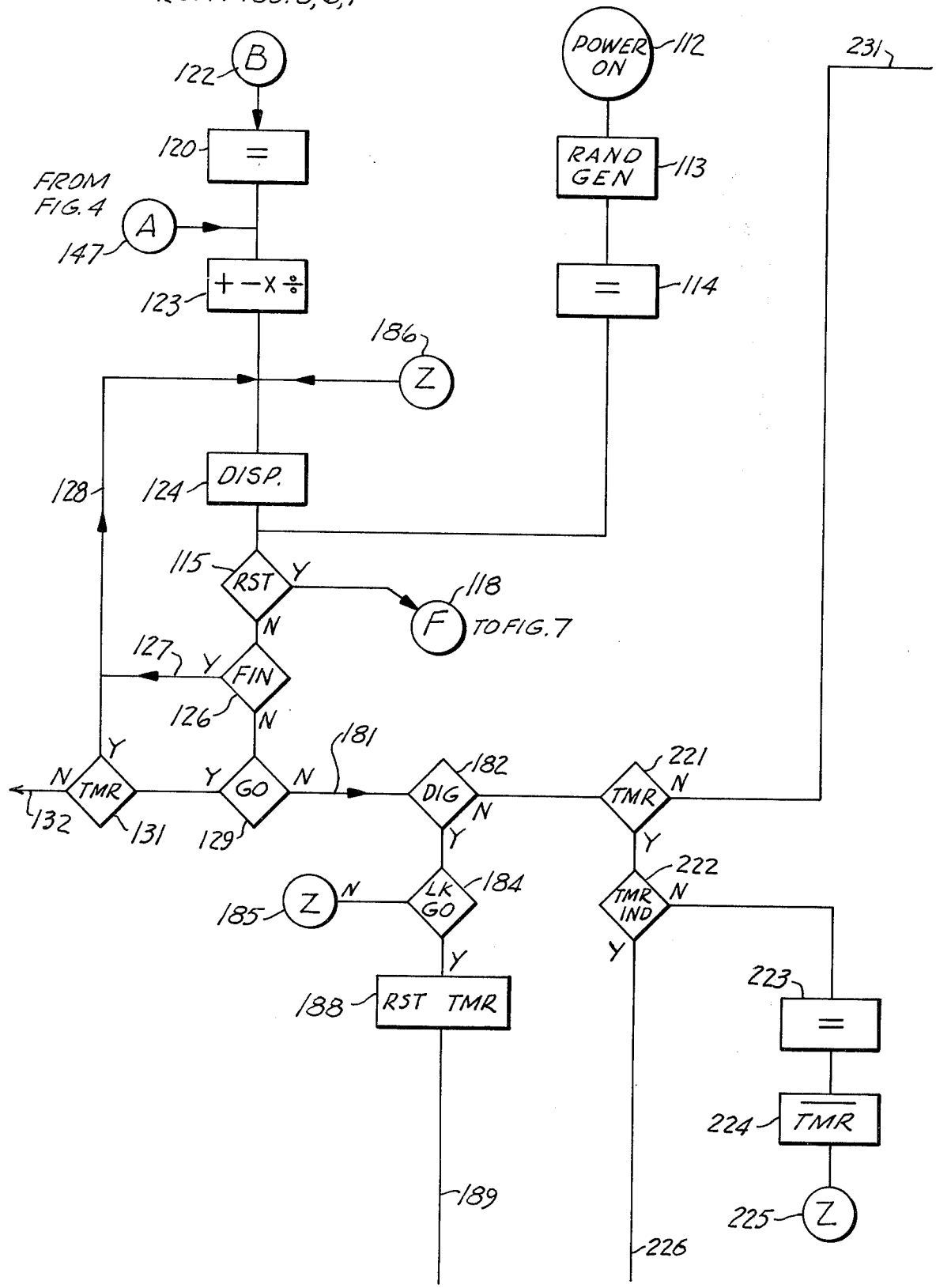

The power on condition is indicated in FIG. 3 by a circle 112. As indicated by the block 113, the initial random number generation may take place immediately at that time. As further indicated by the block 114, the equalization sign is displayed to indicate that the power is on. This corresponds to the state 52 shown in FIG. 2.

The apparatus then proceeds to a test function 115 which determines whether the apparatus is reset for the start of an operating cycle. If the determination by the function 115 is in the affirmative, the apparatus proceeds to the block 117 in FIG. 7, as indicated by the circle 118 in FIG. 3 and the corresponding circle 119 in FIG. 7. An affirmative answer to the test function 115 may be provided by depressing the reset key 25.

According to the block 117 the digit display is blanked at that time as a safety that no digits light up while a status reset is going on. The status reset according to the block 118 generally clears the apparatus. To explain this operation, reference has to be made at this juncture to certain blocks and functions more fully discussed below.

Figure 4:
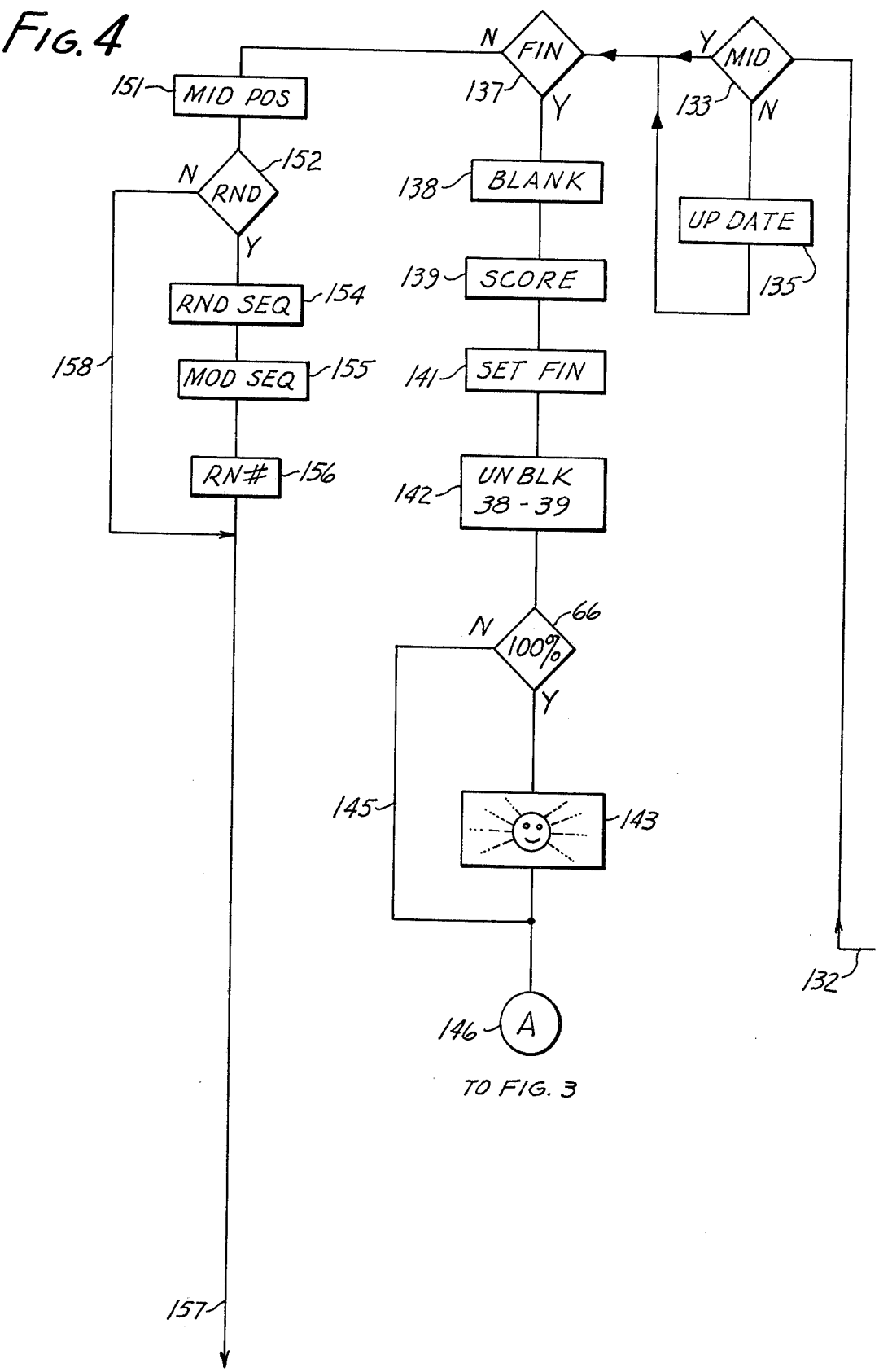
Figure 5:
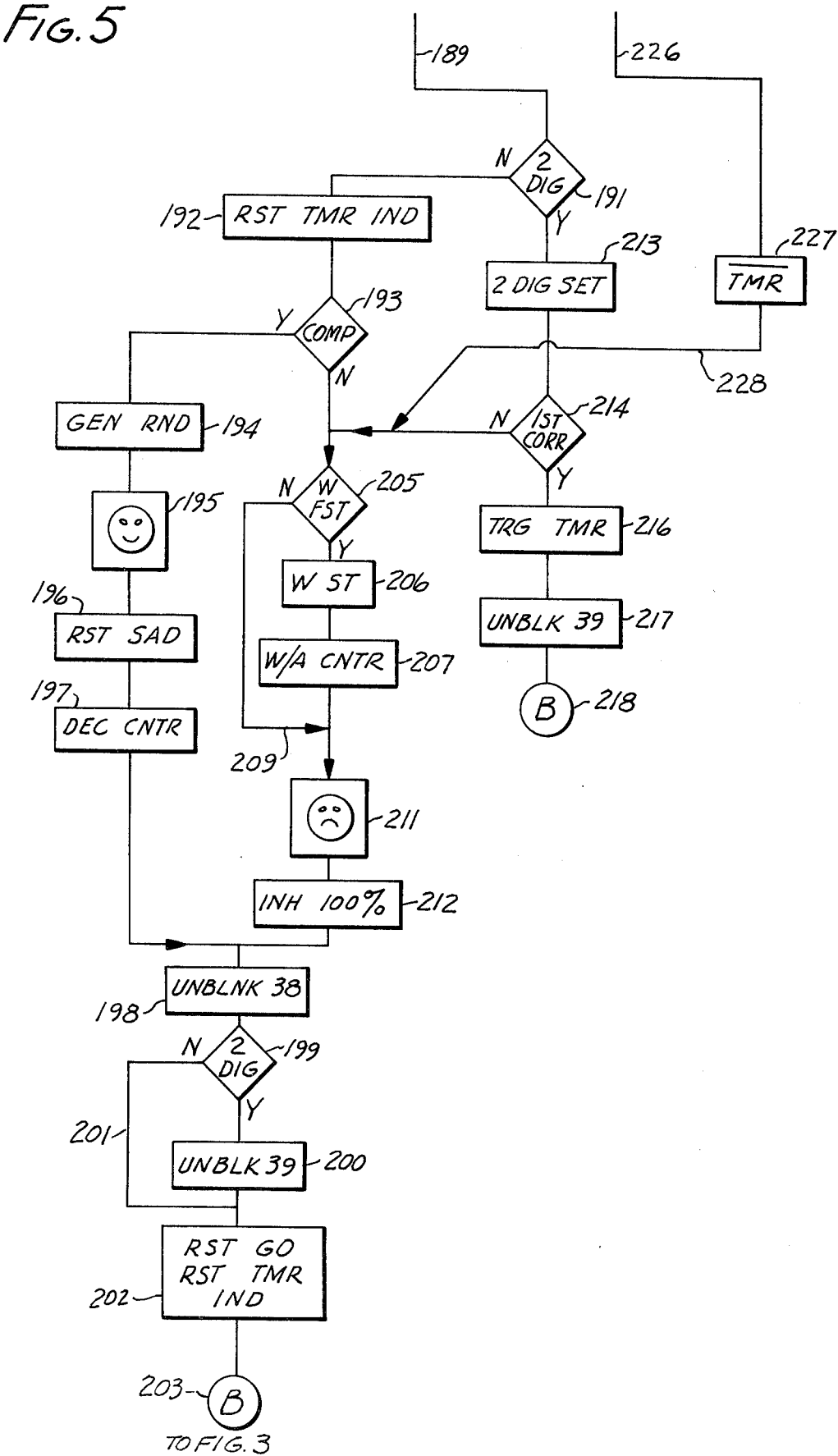
Figure 6:
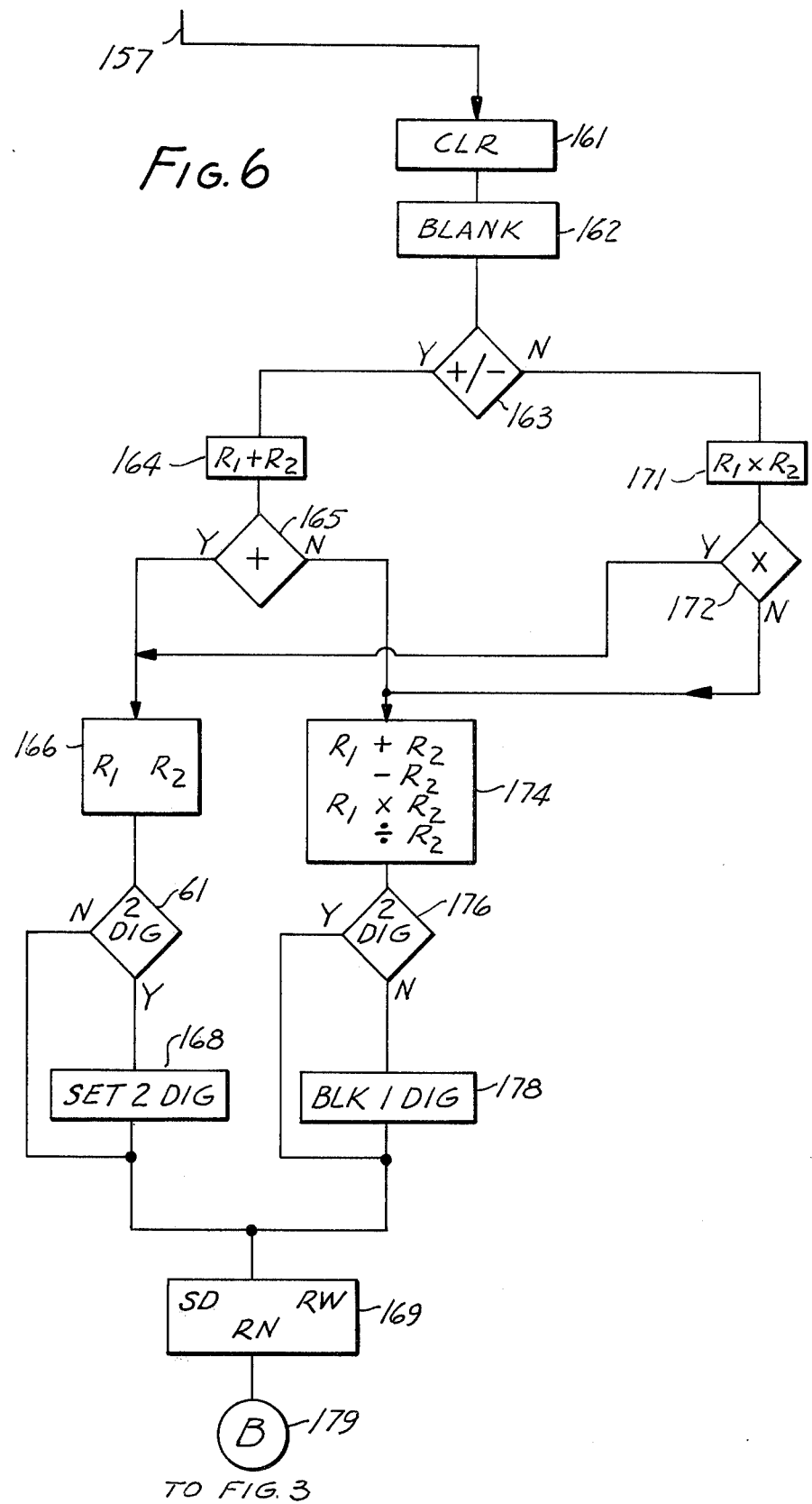

In particular, the status reset block 118 resets the "problem set finished" state block 141 shown in FIG. 4, the mid lesson position block 151 and the random number generation block 156, both shown in FIG. 4, the unneeded entry clearing and go flag block 161 and the two-digit answer set block 168, both shown in FIG. 6, and the wrong answer count block 207, the perfect score display block 212 and the timer indicator setting block 216, shown in FIG. 5.

It may be helpful at this juncture to note that, alternatively, the block 156 (FIG. 4) may be reset at 194 (FIG. 5), the block 161 (FIG. 6) may be reset at 202 (FIG. 5), the block 168 (FIG. 6) may be reset at 213 (FIG. 5), the block 207 may be reset at 196 (FIG. 5), and the block 216 may be reset at 202 or 227 (FIG. 5).

The apparatus proceeds from the block 118 in FIG. 7 to the block 120 in FIG. 3, as indicated by the circles 121 and 122 in FIGS. 7 and 3, respectively. As indicated by the block 120, the display of the equal sign is then continued.

The apparatus then proceeds to the block 123 for a display of the selected arithmetic sign. As indicated by the block 124, the apparatus further proceeds to a reset condition in which the arithmetic function and equalization sign display continues until a key is depressed. In the latter case, the apparatus will proceed to the previously described test function 115 and will proceed to the block 117 in FIG. 7 if that test results in an affirmative determination.

On the other hand, if the particular test results in a negative determination, the apparatus proceeds to the test function 126 which examines whether the particular set is finished, as has been discussed above in connection with the function 65 in FIG. 2. If the test function 126 leads to the conclusion that the particular set has been finished, the apparatus reverts to the rest status 124 via lines 127 and 128.

Conversely, if the function 126 determines that the particular set has not been finished, the apparatus proceeds to a test function 129 which examines whether the go key 24 shown in FIG. 1 has been actuated. If so, the apparatus proceeds to a test function 131 which determines whether the timing operation discussed above in connection with the status 55 in FIG. 2 is in progress at that time. If so, the apparatus reverts to the rest condition 124 via the line 128.

If no timing operation is proceeding at that time, the apparatus advances via line 132 to the test function 133 shown in FIG. 4. The function 133 effects a mid lesson test to check whether the particular problem set (the particular "lesson") has progressed beyond a point (such as beyond the middle of the set) at which change of the difficulty level and of the number of problem selection by the pupil would still be tolerable or desirable. If the test function 133 determines that the apparatus is not in a mid lesson condition, then the program proceeds to the block 135 for an update of the difficulty level condition in accordance with the setting of the difficulty level knob 41 and of the "number of problem per set" selection in accordance with the setting of the knob 42. After the update according to block 135, the apparatus proceeds to a test function 137. Similarly, the apparatus will proceed directly from the test function 133 to the test function 137 if the function 133 indicates the existence of a mid lesson condition. In consequence, no change of difficulty level or problem number selection is possible in the illustrated preferred embodiment mid stream of a set, as mentioned above.

The function 137 tests whether the apparatus has arrived at the end of a problem set. In terms of hardware, this determination may be made by checking a counter for a zero condition, if that counter, after having been set in accordance with the number of problems selected by the knob 42, is decremented by one step for each correctly answered problem.

In response to a determination that the end of a problem set has been reached, the apparatus advances to a block 138, according to which the display on the panel 15 is blanked.

The apparatus then advances to the block 139 which initiates a display of the score which, for instance, may be in the form of an indication of the number of problems the pupil has answered correctly at first try in the particular test set.

The apparatus now advances to the set finished state 141 and thence to an unblanking of the digits 38 and 39 for a display of the score on the display panel 15 shown in FIG. 1 and indicated by the block 142 in FIG. 4. The apparatus also advances to the above mentioned test function 66 which determines whether the pupil had a perfect score; that is, 100 percent of the answers were correct at first try. In response to an affirmative determination, the apparatus proceeds to the block 143 for the above mentioned flashing of the happy face 28.

It will be noted that the blocks 142 and 143 in a sense correspond to the state 59 shown in FIG. 2.

The block 142 by itself also corresponds to the state 58, since the block 143 is bypassed as indicated by the line 145 if the test function 66 determines that the pupil did not achieve a perfect socre. The apparatus may now return to the state 123 as indicated by the circles 146 and 147 in FIGS. 4 and 3, respectively. This corresponds to the reset 101 or 102 shown in FIG. 2 and necessitates an actuation of the reset key 25.

If the test function 137 shown in FIG. 4 determines that the end of a problem set has not been reached, the apparatus proceeds to the mid lesson position block 151 which enters the affirmative determination by the test function 133 in a status register. The apparatus now proceeds to the test function 152 which examines whether a new random number generation is required, such as by an update indicated by the block 135. In response to an affirmative determination by the test function 152, the apparatus proceeds to the random sequence block 154 and to the modified sequence block 155. By way of example, the block 154 may involve the generation of a digit suitable for display at the position 34 in FIG. 1, while the block 155 provides a smaller digit suitable for display at the position 36. This digit may be a reduced number if the difficulty level is 0–3, 4–6 or 7–9. In the division mode, a check is preferably done to assure that no 0 will appear in the position 36. It will be noted in this respect during our consideration of FIG. 6 that the display itself of the randomly generated digit at the positions 34 and 35 may be modified during subtraction and division.

The apparatus then proceeds to the block 156, indicating the status of accomplished random number generation.

The apparatus now proceeds along the line 157 to FIG. 6. If the test function 152 determines that no new random number generation is required at that juncture, the apparatus may directly proceed from the function 152 to the line 157 as indicated by the arrow 158.

Proceeding along the line 157 from FIG. 4 to FIG. 6, the apparatus will reach the blocks 161 and 162 according to which unneeded entries, such as sad and happy face conditions, are cleared and unneeded displays are blanked. The apparatus further proceeds to a test function 163 which determines whether or not the apparatus has been set for subtraction or addition, such as by actuation of a particular arithmetic function key 23 shown in FIG. 1. In response to a determination that it has, the apparatus is advanced to the block 164 which adds the randomly selected numbers $R_1$ (see block 154) and the randomly selected number $R_2$ (see block 155) and sets aside the result.

The apparatus next proceeds to the test function 165 which determines whether the function that may either be an addition or a subtraction is in fact an addition. In response to a determination that it is, the apparatus proceeds to the block 166 where the random numbers $R_1$ and $R_2$ are stored.

Pursuant to the test function 61 discussed above in connection with FIG. 2, the apparatus now determines whether the particular problem calls for a two-digit answer.

In response to a determination that it does, the equipment is set for a two-digit answer, as indicated by a block 168.

The apparatus proceeds to the block 169, either from the block 168 or then from the function 61 if the particular problem does not call for a two-digit answer. The block 169 stands for the seeding the raw random number, which may proceed as more fully described below in connection with the hardware disclosure.

Reverting now to the test function 163 shown in FIG. 6, it will be noted that the apparatus will proceed to a block 171 in response to a determination that the set arithmetic function is neither an addition nor a subtraction. Pursuant to the block 171, the first and second random numbers $R_1$ and $R_2$ are multiplied and the result is stored without being displayed at that time. The apparatus then proceeds to the test function 172 which determines whether the set arithmetic function which is neither an addition nor a subtraction is in fact a multiplication. In response to a determination that it is, the apparatus proceeds to the block 166, where the random numbers $R_1$ and $R_2$ are stored. The apparatus then proceeds in the above mentioned manner to the block 169.

An important feature of the disclosed apparatus will now be described with the aid of FIG. 6. This feature is particularly important if or when it is desired that no negative or fractional answers be displayed by the teaching apparatus. Of course, there may be apparatus and difficulty levels where an excursion into negative answers in the case of subtraction and fractional answers in the case of division may be desirable.

However, in apparatus or difficulty levels or lower grades, such excursions are typically to be avoided.

In brief, the apparatus herein disclosed includes means for avoiding negative and fractional answers. One technique for accomplishing this function would be to test each calculated result during the subtraction or division mode for negative or fractional answers and to reject the particular problem prior to its display if it is determined that that problem calls for a negative or fractional answer.

A less time consuming and more direct method in accordance with the illustrated system will now be disclosed with the aid of FIG. 6.

In particular, the apparatus proceeds to a block 174 if the previously described test function 163 has determined that the then prevailing arithmetic function is either an addition or subtraction, and if the test function 165 has determined that the particular arithmetic function is not an addition, but rather a subtraction. In that case, the block 174 stores the sum of the random numbers $R_1$ and $R_2$ as the minuend and $R_2$ as the subtrahend for the particular arithmetic subtraction. $R_1$ is then the correct answer sought from the student.

By way of alternative, either $R_1$ or $R_2$ may be employed as the subtrahend, or the subtrahend may alternate between $R_1$ and $R_2$ for different problems.

It is thus seen that the apparatus shown in FIGS. 4 and 6 involves means for randomly providing two numbers, $R_1$ and $R_2$, means connected to the random number providing means for providing a further number by adding the two numbers $R_1$ and $R_2$ and means for employing or presenting this further number as the minuend and one of the two numbers $R_1$ and $R_2$ as the subtrahend in an arithmetic subtraction problem.

Similarly, if the test function 163 determines that the then prevailing arithmetic function is neither an addition nor a subtraction (which means that it is either a multiplication or a division) and if the test function 172 then determines that the particular function is not a multiplication, but rather is a division, then the apparatus also proceeds to the block 175.

This time, the product of the random numbers $R_1$ and $R_2$ is stored for the employment of that product as the dividend in an arithmetic division problem. One of the random numbers, $R_2$, is then stored as the divisor in that problem, and $R_1$ then is the correct answer sought from the student.

By way of alternative, $R_1$ or $R_2$ may be used for that purpose, or $R_1$ may be used for one problem and $R_2$ for another problem in a series of problems which are mixed as to difficulty level.

It is thus seen that the illustrated apparatus includes means for randomly providing two numbers, $R_1$ and $R_2$, and for providing a further number by multiplying these two numbers, $R_1 \times R_2$, and means for presenting the further number (i.e. the product of the latter multiplication) as the dividend and one of the two numbers ($R_1$ and $R_2$) as the divisor in an arithmetic division problem.

The technique and the means represented by the block 174 thus avoid negative answers in subtraction problems, at least as long as $R_1$ and $R_2$ are positive or as long as at least the random number $R_1$ or $R_2$ which is used as the minuend is positive. Similarly, the technique and means illustrated by the block 174 avoids fractions in the answers to arithmetic division problems, at least as long as the random numbers $R_1$ and $R_2$ are whole integers.

A further advantage of the system illustrated by the block 174 is that the result of the subtraction or division need not really be calculated beyond an addition or multiplication of $R_1$ and $R_2$. For instance, the result of $(R_1 + R_2) - R_1$ is certain to be $R_1$ without any calculation. Similarly, the result of $(R_1 + R_2) - R_1$ is certain to be $R_2$ without any calculation. Correspondingly, the result of $(R_1 \times R_2) \div R_1$ is certain to be $R_2$, while the result of $(R_1 \times R_2) \div R_2$ is certain to be $R_1$ without any calculation. This saves a further calculation step in the illustrated equipment for both subtraction and division. In practical terms, one of the random numbers $R_1$ and $R_2$ may be stored as the result if the other of these random numbers is employed as the subtrahend or divisor in the particular subtraction or division problem. As a result, the teaching apparatus does not have to perform any actual subtraction and division, but is yet capable of testing the pupil in subtraction and division by presenting actual subtraction and division problems to him.

This contrasts the apparatus herein disclosed very favorably in terms of pedagogical value from those prior-art machines which were limited to presenting subtraction or division problems in the inverse and frequently confusing form of $R_1 + ? = (R_1 + R_2)$, or $R_1 \times ? = (R_1 \times R_2)$.

The apparatus proceeds from the block 174 to the test function 176 which determines whether or not to unblank the position 35. The test function 176 and the block 178 set the answer response length to "one," since this is the only possible length for subtraction and division in the illustrated embodiment.

For subtraction and division, position 35 may or may not be zero and therefore may or may not have to be blanked. Since a leading zero at position 35 accomplishes nothing, such a zero is blanked in the illustrated embodiment.

If desired, the random number selection of $R_1$ or $R_2$ and $R_2$ may be extended in the two-digit area, in which case there may be two-digit answers even in subtraction and division. In that case, the parts 176 and 178 would be replaced by parts similar to the test function 61 and the block 168 for handling the matter of two-digit answers.

In either case, the apparatus advances to the block 169 for a seeding of the raw random number. From the block 169, the apparatus proceeds to the blocks 120, 123 and 124, as indicated by the circles 179 and 122 in FIGS. 6 and 3, respectively.

The apparatus having thus arrived at the block 124, the particular arithmetic problem is displayed to the pupil without a display of the answer at that time. This condition corresponds to the state 54 shown in FIG. 2. Pursuant to the above description of FIG. 6, it will be realized that the problem displayed at this particular instant on the display panel 15 shown in FIG. 1 according to the block 124 shown in FIG. 3 is either an addition or multiplication problem prepared pursuant to the blocks 166 and 164 or 171, or a subtraction or division problem prepared pursuant to the blocks 174 and 164 or 171.

The apparatus now goes through the previously described test functions 115, 126 and 129, to arrive at the branch 181, if these test functions determine that the apparatus is neither at the start nor at the end of a test cycle and that the go key 24 is not depressed at that instant.

The apparatus thus arrives at the test function 182 to determine whether or not the pupil depresses an answer or digit key 20. In response to depression of such a key 20 by the pupil, the apparatus proceeds to the test function 184 which checks whether the last key has been executed by the pupil. In practical terms, this comprises a test of whether the go key 24 has been previously executed to provide for a display of a problem pursuant to the block 124. If that previous execution has been omitted, amounting in effect to the actuation of an answer key without the presence of a problem, the apparatus reverts to the block 124 via the circles 185 and 186 whereby the above mentioned routine for the provision and display of a problem is effected or repeated.

In response to a determination that the go key 24 has been properly executed for the presentation of a problem prior to actuation of a digit key, the apparatus proceeds from the test function 184 to the block 188 to reset the above mentioned two-digit timer or timing function, to make sure that that timing function is not operating and interfering at that time. The apparatus then proceeds via a line 189 to a test function 191, shown in FIG. 5, for a determination whether a problem calling for a two-digit answer is present in response to a determination that the displayed problem calls only for a one-digit answer, the apparatus proceeds to a block 192 which resets the timer indicator.

In practical terms, this means that any initiation or triggering of the above mentioned 10 second timing cycle is inhibited so as not to interfere with the function of the apparatus at that time.

The apparatus now proceeds to a test function 193 which compares the answer supplied by the pupil by the depression of an answer key 20 to the answer calculated or determined by the apparatus pursuant to blocks 164, 171, 166 or 174 shown in FIG. 6.

In response to a determination that the pupil has supplied the correct answer, the apparatus proceeds to the block 194 and thence to the block 195. At block 194 the status flag is reset so that the next pass through the test function 152 will permit a pass through blocks 154 and 155, thereby generating new $R_1$ and $R_2$ numbers at that time. At the block 195 the display of the happy face 28 is set. Conversely, the sad face 29 is reset at a block 196. Moreover, the count of the problem within the particular problem set is established pursuant to a block 197. In practical terms, this may be done by initially setting a counter to the number of problems selected by adjustment of the knob 42 shown in FIG. 1 for the particular set, and by thereafter decrementing that counter by one step each time a problem has been correctly answered. It will be noted that this ties in with the scoring and perfect score determination represented by the block 139 and the test function 66 in FIG. 4.

The apparatus then proceeds to the block 198 for a unblanking of the digit position 38 shown in FIG. 1 preparatory to the display of the digit representing the correct result in a one-digit answer, and a happy face.

The test function 199 shown in FIG. 5 then determines the presence of a two-digit answer and, according to a block 200, unblanks the digit position 39 for a display of the first digit of the two-digit answer; the second digit being displayed at the position 38. The block 200 is bypassed as indicated by the lead 201 and the digit position 39 remains blanked if the test function 199 determines that the displayed problem only calls for a one-digit answer.

In either case, the apparatus proceeds to a block 202 for a reset of the above mentioned go function and timer indicator, and proceeds further to blocks 120, 123 and 124 via circles 203 and 122 shown in FIGS. 5 and 3, respectively, for a display of the correct answer together with the happy face 28.

Conversely, the apparatus proceeds to a test function 205 when the test function 193 determines by way of the above mentioned comparison that the answer entered by the pupil was wrong. In that case, the test function 205 determines whether this is the first time that the student has answered the displayed problem incorrectly ("Wrong First Time Question"). If so, the apparatus proceeds to the block 206 which sets the wrong status.

According to a block 207, a wrong answer count is then effected. In practical terms, this may be done by either incrementing or decrementing a wrong answer counter. Alternatively, the functions with respect to the blocks 197 and 207 could be correlated so that one previously set counter is decremented either only in response to a correct answer, whereby the count at the end of the set will indicate the number of problems answered incorrectly at first count, or then only in response to incorrect answers at first try, whereby the count at the end of the set will indicate the number of correct answers.

If the test function 205 determines that the displayed problem has been incorrectly answered before by the pupil, the blocks 206 and 207 are bypassed as indicated by the line 209 so that the pupil is not penalized for wrong answers to the same problem at a second and subsequent try. Of course, it is a problem of pedagogic evaluation whether or not the pupil should be penalized for repeatedly wrong answers to the same problem and, if so, one may delete the test function 205 and bypass 209 so that the wrong answer count is activated even for repeated incorrect answers to the same displayed problems.

In either case, the apparatus proceeds to a block 211 providing for a display of the sad face 29 shown in FIG. 1. Pursuant to a block 212, the perfect score display (see function 66 and block 143 in FIG. 4) is inhibited.

The apparatus then proceeds via block 198, test function 199, block 200 et seq. to a display of the correct answer together with a display of the sad face 20. This corresponds to the status 57 shown in the macro flow diagram of FIG. 2.

Reverting now to the test function 191 shown in FIG. 5, a determination of the presence of a problem calling for a two-digit answer leads to a block 213 which sets the apparatus for the two-digit answer mode. Accordingly, the apparatus proceeds to the test function 214 which compares the first digit entered by the pupil to the first digit of the correct answer. If the test function 214 leads to a determination that the first digit entered by the pupil was already incorrect, the apparatus proceeds immediately to the test function 205, whereupon the pupil's answer is handled in the same above mentioned manner as if the test function 193 had determined the presence of an incorrect answer.

If the test function 214 determines that the pupil has entered the correct first digit, the apparatus proceeds to a block 216 which sets the above mentioned timer indicator and triggers the timer for initiation of the above mentioned 8 second timing cycle. Also, the digit position 39 shown in FIG. 1 is unblanked pursuant to the block 217 whereby the first correct digit may be displayed to the student at that time. To this end, the apparatus proceeds to the blocks 120, 123 and 124 in FIG. 3 via the circles 218 and 122 shown in FIGS. 5 and 3, respectively.

The latter procedure embodies an important feature of the disclosed apparatus, discussed above in connection with the status 55 shown in FIG. 2.

Reverting now to FIG. 3, the apparatus proceeds from the test function 182 to a timeout function 221 whenever an answer digit 20 is depressed. As mentioned above, the timeout may be set for 8 seconds. If no further key is actuated after 8 seconds, the apparatus proceeds to a test function 222 which determines whether a timing cycle is then in progress. If not, the apparatus proceeds to a display of the equal sign pursuant to a block 223, to an inhibition or deenergization of any timing function pursuant to a block 224 and to a return to the display block 124 via circles 225 and 186 in FIG. 3.

Conversely, if the test function 222 determines that a timing cycle was in progress while the above mentioned 8 seconds expired, the apparatus proceeds to a block 227 for a cancellation of the timing sequence and thence via a lead 228 directly to the test function 205, whereby the display will be handled as if the comparison function 193 had determined the presence of a wrong answer. This response to the dotted line 92 in the macro flow diagram of FIG. 2.

If the student enters the second digit of a two-digit answer prior to expiration of the 8 second time delay, the apparatus proceeds from the text function 182 to the test function 184 as shown in FIG. 3.

The apparatus then goes through the above mentioned routine described in connection with the circle 185 on the one hand and with respect to the block 188 and its associated functions and blocks 191 et seq. shown in FIG. 5. At block 188, the timing function is reset and the apparatus proceeds via the lead 189 to the test function 191. This test function treats the second digit in a two-digit answer in the manner of a one-digit answer and advances the second digit entered by the pupil via the block 192 to the comparison function 193.

The comparison function 193 now compares the second digit entered by the student to the second digit of the correct answer determined by the apparatus as described above in connection with FIG. 6. Correct and incorrect entries are then handled in the manner described above in connection with the display of the happy face (see blocks 195 et seq.) and the display of the sad face (see blocks 211 et seq.), respectively.

As shown in FIGS. 5 and 7, a lead 231 proceeds from the negative condition of the timeout function 221 to a mid position function 232. In response to a determination that the above mentioned mid sequence condition is present while no timeout condition exists, the apparatus reverts to the display status 124 as indicated by the circles 234 and 186 in FIGS. 7 and 3, respectively.

On the other hand, if the reset key 25 shown in FIG. 1 has been previously depressed (note test function 115, FIG. 3), if the apparatus is not in a set finished condition (function 126), if the go key 24 has not yet been depressed (function 129), if no digit key 20 has been depressed (function 182) or, if depressed, had no other consequence than cycling the apparatus through the block 124 (circles 185 and 186), if no timeout condition is present (function 221) and if no mid sequence condition exists (function 232, FIG. 7), then the apparatus proceeds to the test functions 236, 237, 238 and 239 shown in FIG. 7. As indicated by the arithmetic function symbols shown in the associated diamonds, the function 236 to 239 determine which one of the keys 23 has been last depressed for an initiation of a particular arithmetic function.

Accordingly, the arithmetic sign and function desired for a particular set of problems can be changed as long as the go key 24 has not been depressed for a provision and display of the first problem of the set.

As indicated by the blocks 241, 242, 243 and 244 associated, respectively, with the arithmetic sign test functions 236, 237, 238 and 239, the selected arithmetic functions may be represented by a binary code which, in turn, is supplied via the blanking function 117 to the status block 118.

This arithmetic sign selection proceeds via circles 121 and 122 and via the block 120 to the block 123 for a display of the chosen arithmetic sign at the position 32 shown in FIG. 1.

This condition corresponds in effect to the status 53 shown in the macro flow chart of FIG. 2. The further functions of the apparatus now proceed in the above mentioned manner, and the first problem of the set is generated and displayed upon actuation of the go key 24 (not test function 129 in FIG. 3). After each correct answer, the generation and presentation of further problems are initiated by a renewed depression of the go key 24, until the particular set of problems according to the number selected with the aid of the knob 42 shown in FIG. 1 has been completed.

A preferred embodiment of the hardware of the disclosed teaching apparatus will now be described with the aid of FIGS. 8 to 13.

Figure 8:
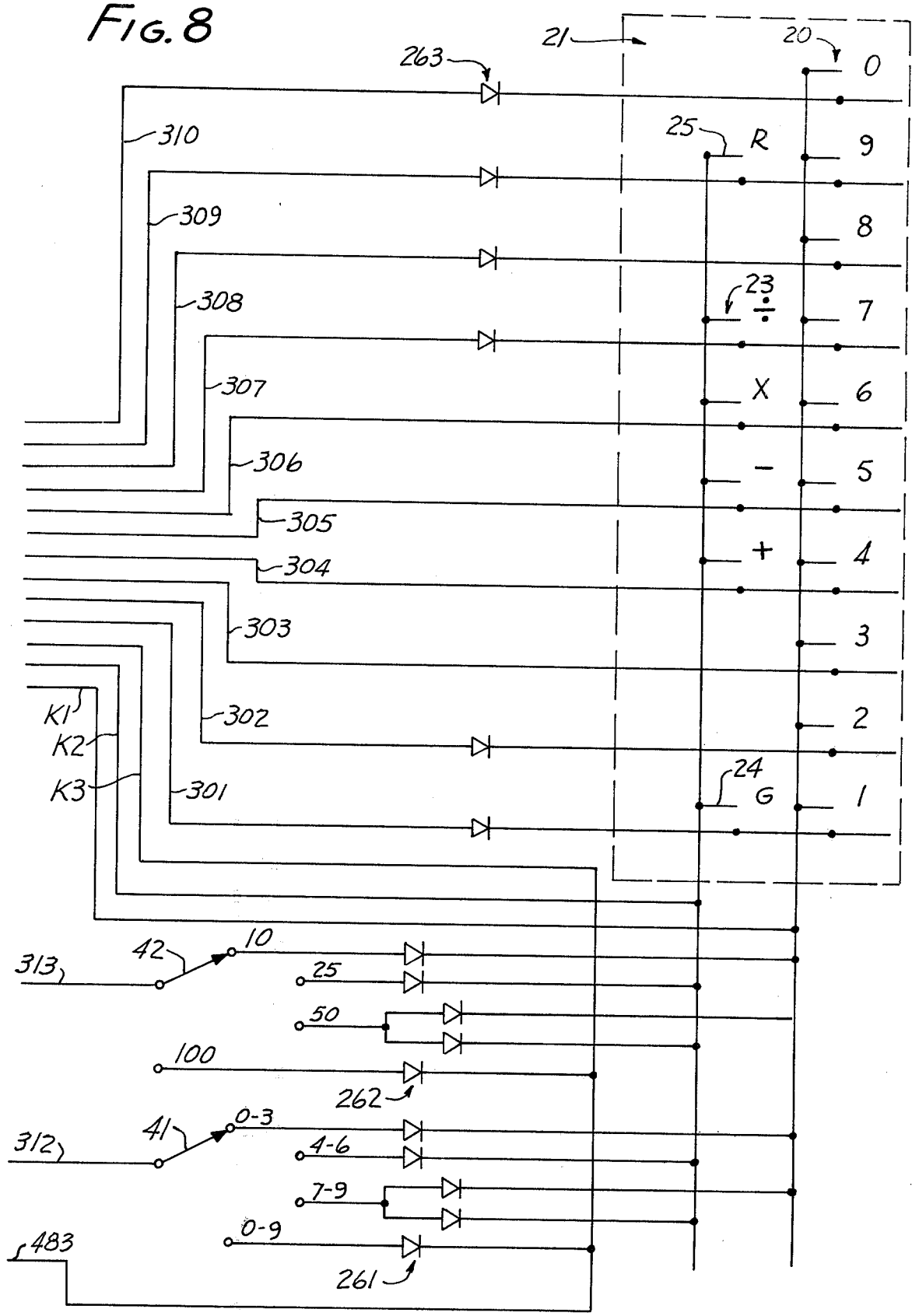
FIGS. 8 to 11 are circuit diagrams of hardware of the disclosed teaching apparatus according to a preferred embodiment of the invention.

In particular, FIG. 8 is a circuit diagram of the answer keys 20 covering the digits 1 through 0, of the arithmetic function keys 23, of the go key 24, of the reset key 25, of the difficulty level selector switch 41 and of the number of problems per set selector switch 42. These keys and the panel 21 on which they are located, as well as the selector knobs or switches 41 and 42, have been discussed above in connection with FIGS. 1 to 7.

Conventional banks of coupling diodes 261, 262 and 263 are associated with the switches 41 and 42 and with certain of the keys 20, 23, 24 and 25, as shown in FIG. 8.

Figure 9:
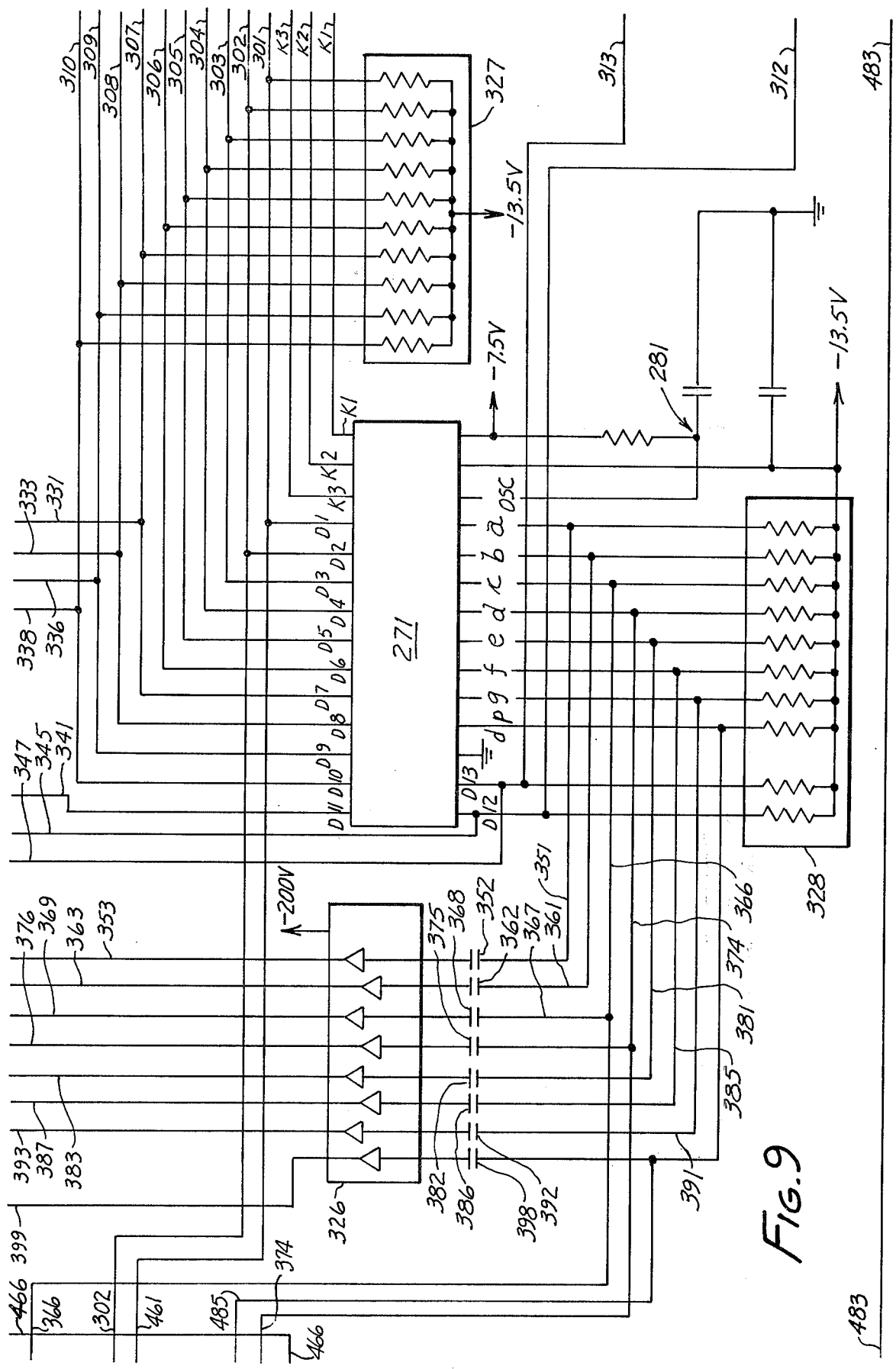

The heart of the apparatus is a computer or master calculator shown generally at 271 in FIG. 9 and more specifically in FIG. 12. The practice of the illustrated teaching system is not limited to any particular computer, data processor or other equipment. However, the best mode presently contemplated employs an integrated circuit master calculator type Intel 1502-011, manufactured by Intel Corporation, of Santa Clara, California 95051, and described in Intel 1502 Application Note (1974).

As seen in FIG. 12, the master calculator 271 is designed around a central processor which has an arithmetic unit 273 that may be dedicated for decimal arithmetic, a program counter 274 which defines the addresses of memory locations in a read only memory (ROM) 275, and an instruction register 276.

The processor communicates with the memory, with a keyboard register 276 and a display decoder 277 via a data bus 278. The ROM 275 may be programmed in a conventional manner in accordance with the previously described and illustrated functions. While software programming is not necessarily beyond the scope of the disclosed system, firmware programming is presently preferred. By way of example, if the master calculator 271 comprises an integrated circuit chip, then the ROM 275 may be microprogrammed by preparing a mask layer on a "device or no device" basis as is well known and conventional per se in the integrated circuit art. Briefly, the ROM may effectively be programmed in a firmware fashion by selectively providing or omitting memory function devices. The master calculator 271 thus is a hardware and firmware special purpose device.

All calculator timings may be effected by a master oscillator and clock generator 279 which may provide the traditional clock phases $\phi_1$ and $\phi_2$ in a conventional manner, using an RC element 281 shown in FIGS. 9 and 12.

In addition to the instruction register 276, a state counter 282 interfaces with the control 283. The state counter 282 keeps track of the instruction cycles.

As seen in FIGS. 8, 9 and 12, input signals from the keys 20, 23, 24 and 25 and from the selector switches 41 and 42 are applied to the master calculator via lines K1, K2 and K3. As seen in FIG. 12, these signals are subjected to debouncing in the keyboard debouncer 280 which may be of a conventional type, operating either by digital integration or digital logic.

For instance, the keyboard debouncer may operate so as to determine that signals are not genuine keyboard entry signals if they occur within such short a time after an initial signal that they could impossibly have been caused by a repeated intentional actuation of the keyboard.

The debounced keyboard signals proceed to the keyboard register 276 which stores the key and rotary switch inputs.

The master calculator 271 further includes a random access memory (RAM) 284 which may also be of a conventional type, having a multiplexer 285 and a digit counter 286 associated therewith. If the RAM 284 is of an electric charge type, it is also provided with a refresh counter 287 which, in a conventional manner, periodically goes through the memory locations to locate the charged locations and to continually recharge them. The RAM 284 takes also care of the status functions (see, for instance, block 118 in FIG. 7).

The state counter 282 communicates via a line 287 with the keyboard debouncer 280 program counter 274, ROM 275, arithmetic unit 273, RAM 284, multiplexer 285, and seven-segment decoder 277 as shown in FIG. 2.

Similarly, the control 283 communicates via a line 288 with the arithmetic unit 273, the program counter 274, the ROM 275, the keyboard debouncer 280, the RAM 284, the multiplexer 285, the digit counter 286, and a binary code to decimal converter 291. Lines 287 and 288 are control lines permitting the control 283 to halt or advance particular components or sectors within the calculator 271, either directly or through the state counter 282, as is, per se, well known in the art.

The digit counter 286, in turn, communicates via a line 292 with the keyboard register 276, the keyboard debouncer 280, and the binary code to decimal converter 291.

Figure 10:
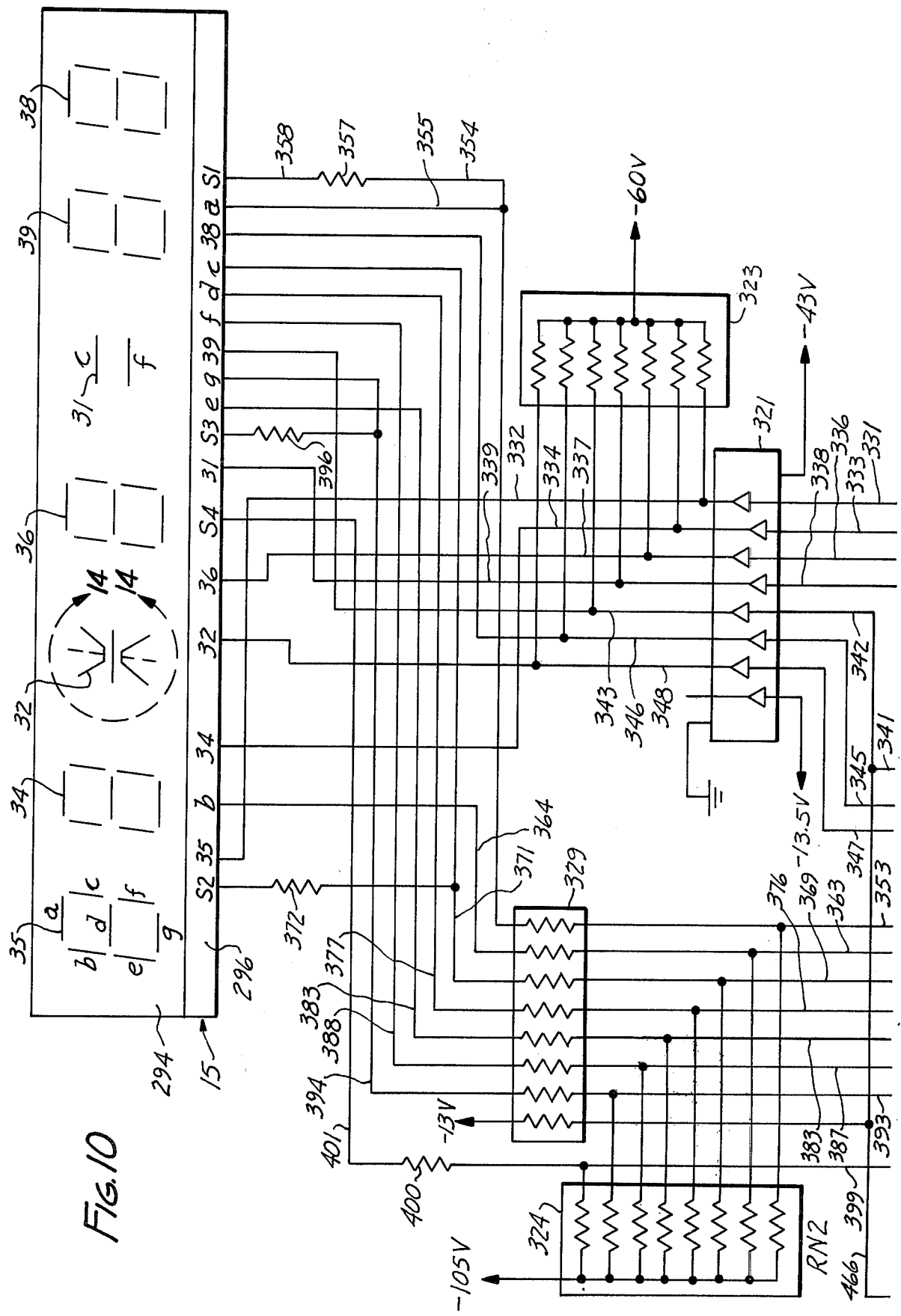

The binary code to decimal converter 291 of the master calculator chip 271 (see FIGS. 9 and 12) scans the keyboard 21 and switches 41 and 42 shown in FIG. 8 and the digit and arithmetic sign display 294 of the display panel 15 (see FIGS. 1 and 10). To this end, the master calculator 271 in general or, as more specifically shown in FIG. 12, the converter 291, has a series of outputs D1 through D13 which successively issue mutually staggered scanning pulses, as illustrated in FIG. 13, showing the timing of the pulse of each output relative to the other output pulses and relative to a time axis $t$.

The pulses of the outputs D1 through D10 scan the digit or response keys 20, the arithmetic function keys 23, the go key 24 and the response key 25 via lines 301 through 310 as shown in FIGS. 8 and 9. Similarly, the pulses of the outputs D12 and D13 scan the difficulty level and problem number selector switches 41 and 42 via lines 312 and 313, respectively, as also shown in FIGS. 8 and 9. The pulses resulting from this scanning operation are applied to the keyboard debouncer 280 of the master calculator 271 via lines K1 to K3, as shown in FIGS. 8, 9 and 12.

The digit and arithmetic sign display device 294 of the display panel 15 may be of a conventional type. Present state of the art display devices include, for instance, liquid crystal display devices, light emitting diode display devices, and neon or other gas discharge display devices. By way of example, and not by way of limitation, the present disclosure is styled in terms of a neon display device.

As is typical with many prior-art devices of this type, each of the digits 34, 35, 36, 38 and 39 includes seven segments $a, b, c, d, e, f$ and $g$ arranged in a figure of eight configuration, enabling the alternative display of each of the ten decimal digits 1 through 0 by a selective energization of the various segments.

The various segments are designated by the above mentioned low-case letters for the digit 35 in FIG. 10. In practice, correspondingly positioned segments of the digits 34, 35, 36, 38 and 39 are interconnected by a lead or other electric conductor as shown, for instance, in U.S. Pat. No. 3,694,693, by George E. Holz, issued Sept. 26, 1972, and herewith incorporated by reference herein and U.S. Pat. No. 3,849,694, by Edgar Lloyd Harvey and Joel Martin Levine, issued Nov. 19, 1974, and herewith incorporated by reference herein.

Pursuant to the disclosures of those incorporated patents, the segments of each digit or mathematical sign may be employed as first electrodes or cathodes in an electric discharge environment including a charge of ionizable gas, while the segments of each digit have their common second electrode or anode associated therewith.

This anode, indicated in dotted outline at 297 in FIG. 14, may, for instance, be in the form of a frame essentially encompassing the associated segment electrodes, or in the form of an electrically conducting, light transparent layer deposited on a glass panel adjacent the associated group of segment electrodes, all in accordance with conventional practice.

To avoid obfuscation of the drawings by secondary details, the leads which interconnect corresponding segment electrodes, as well as details of the anode structure, have not been shown in FIGS. 10 and 14. Rather, FIG. 10 shows a connector panel 296 bearing reference numerals and characters to indicate the interconnection of lines leading into the connector panel 296 with anodes or segment electrodes, as the case may be, of the display device 294. In the case of each anodic electrode, which is common to a particular set of segment electrodes for a specific digit or arithmetic sign display, the connector panel 296 shows the reference numerals of the corresponding digit or arithmetic sign as allocated thereto in FIGS. 1 and 10.

These relationships will now be described in a functional manner for a better understanding thereof.

In particular, the master calculator 271 or its converter 291 (see FIGS. 9 and 12) drive the common electrodes or anodes of the display device 294 via a digit driver or buffer amplifier 321 shown in FIG. 10.

By way of example, the component 321 may be a display driver of the type DM8887 as shown, for instance, on pages 6–37 to 6–40 of the Interface Integrated Circuits Catalog (1974) of the National Semiconductor Corporation.

A conventional type of pull-down resistor bank 323 is connected to the buffer amplifier bank 321 and may, for instance, serve as collector resistors of not specifically illustrated transistors of the individual buffer amplifiers. A resistor bank 324, also shown in FIG. 10, may have a similar purpose as to a segment driver or buffer amplifier bank 326 shown in FIG. 9. Corresponding pull-down resistor banks 327 and 328 are shown in FIG. 9 for the master calculator 271 or, more specifically, for its converter 291 and decoder 277 shown in FIG. 12.

A further bank of resistors 329 may provide a voltage divider network in combination with the resistor bank 324, as shown in FIG. 10.

With this background in mind, it is readily seen from FIG. 9 and 10 that the output D7 of the master calculator 271 (see also FIG. 13) drives the common electrode or anode of the first digit display 35 via leads 307, 331, buffer amplifier 321, lead 332 and connector panel 296. Similarly, the master calculator output D8 drives the common electrode or anode of the second digit 34 via the lead 308, a lead 333, buffer amplifier 321, a lead 334 and connector panel 296.

The master calculator output D9 drives the common electrode or anode of the digit display 36 via the lead 305, a lead 336, buffer amplifier 321, lead 337 and connector panel 296. The master calculator output D10 drives the common electrode or anode of the equal sign 31 via the lead 310, a lead 338, buffer amplifier 321, a lead 339, and connector panel 296. Similarly the master calculator output D11 drives the common electrode or anode of the digit display 39 via a lead 341, a lead 342, buffer amplifier 321, a lead 343, and the connector panel 296. The master calculator output D12 drives the common electrode or anode of the digit 38 via a lead 345, buffer amplifier 321, a lead 346, and the connector panel 296. Moreover, the master calculator output D13 drives the common electrode or anode of the arithmetic function sign display 32 via a lead 347, buffer amplifier 321, a lead 348 and the connector panel 296.

In this manner, the common electrodes or anodes of the digit and arithmetic design displays are sequentially driven as illustrated in FIGS. 9, 10 and 13. It will be noted in this respect, that the common electrode or anode 297 of the arithmetic function display is not driven subsequent to the driving of the common electrode or anode of any adjacent digit. Rather, the anode 297 indicated in FIG. 14 is only driven after the common electrode or anode of a remote digit display, such as the digit display 38, has been driven.

In practice, this prevents unintended energization or so-called "ghosting" of any part of the arithmetic function sign display 32 in response to an energization of an adjacent digit display 34 or 36. To fortify this antighosting effect, the master calculator 271 may provide blanking intervals between the subsequent energization of digit or arithmetic sign displays.

As further shown in FIGS. 9 and 12, the master calculator 271 or its decoder 277 sequentially drives the segment electrodes or cathods of the digit or arithmetic sign displays of the display panel 294. In particular, the $a$ output of the master calculator 271 operates through a lead 351, coupling capacitor 352, buffer amplifier 326, lead 353, resistor bank 324, lead 354, lead 355 and connector panel 296 to energize the correspondingly positioned $a$ segment electrodes of the digit displays 34, 35, 36, 38 and 39. This $a$ output of the master calculator 271 also energizes the S1 segment electrode of the arithmetic function sign display 32 shown in FIGS. 10 and 14 via a resistor 357, a lead 358 and the connector panel 296.

The $b$ output of the master calculator 271 operates through a lead 361, coupling capacitor 362, buffer amplifier bank 326, lead 363, resistor bank 329, lead 364 and connector panel 296 to energize the corresponding $b$ segment electrode of the digit displays 34, 35, 36, 38 and 39 and the upper V-shaped $b$ electrode of the arithmetic function sign display shown in FIGS. 10 and 14.

The $c$ output of the master calculator 271 operates via a lead 366, a lead 367, a coupling capacitor 368, the buffer amplifier bank 326, a lead 369, resistor bank 329, a lead 371 and the connector panel 296 to energize the corresponding $c$ segment electrodes of the digit displays 34, 35, 36, 38 and 39, and the upper segment electrode of the equal sign display 31. This $c$ output also acts via a resistor 372 to energize the segment electrode S2 of the arithmetic function sign display 32 shown in FIGS. 10 and 14.

The $d$ output of the master calculator 277 operates through a lead 374, a coupling capacitor 375, the buffer amplifier bank 326, a lead 376, the resistor bank 329, a lead 377 and the connector panel 296 to energize the corresponding $d$ segment electrodes of the digit displays 34, 35, 36, 38 and 39 and the horizontal bar segment electrode $d$ of the arithmetic function sign display 32 shown in FIGS. 10 and 14.

The $e$ output of the master calculator 277 operates through a lead 381, coupling capacitor 382, buffer amplifier bank 326, lead 382, resistor bank 329, lead 383 and connector panel 296 to energize the $e$ segment electrodes of the digit displays 34, 35, 36, 38 and 39, and the inverted V-shaped $e$ segment electrode of the arithmetic function sign display 32 shown in FIGS. 10 and 14.

Similarly, the $f$ output of the master calculator 271 operates through a lead 385, coupling capacitor 386, buffer amplifier bank 326, lead 387, resistor bank 329, lead 388 and connector panel 296 to energize the corresponding $f$ segment electrodes of the digit displays 34, 35, 36, 38 and 39, and the lower segment electrodes $f$ of the equal sign display 31.

The $g$ output of the master calculator 271 operates through a lead 391, coupling capacitor 392, buffer amplifier bank 326, lead 393, resistor bank 329, lead 394, and connector bank 296 to energize the corresponding $g$ segments of the digit displays 34, 35, 36, 38 and 39. The $g$ output of the master calculator 271 also operates through a resistor 396 and the connector panel 296 to energize the S3 segment electrode of the arithmetic function sign display 32 shown in FIGS. 10 and 14.

In addition to the seven segment drive outputs $a$ through $g$, the decoder 277 also has a $dp$ output which provides an eighth segment driver signal, operating through a lead 397, a coupling capacitor 398, buffer amplifier bank 326, a lead 399, a resistor 400, a lead 401, and the connector panel 296 to energize the lowest segment electrode S4 of the arithmetic function sign display 32 shown in FIGS. 10 and 14.

In accordance with the timing imposed by the master oscillator and clock generator 279, the master calculator 271 supplies the $a$ through $dp$ segment decoder outputs so that gas discharges for a display of the desired digits and arithmetic signs are initiated as the converter outputs D7 to D13 scan the digit and arithmetic sign displays as described above.

By way of example, the buffer amplifier 326 may provide an inverter function and may be of the Series 480 to 482 High-Voltage Display Driver type shown in the Engineering Bulletin 29301, of the Semiconductor Division of Sprague Electric Company of Worcester, Mass. 01606.

The *dp* output may be the decimal point signal supplied by the calculator 271 and, by way of example, coinciding with the D13 pulse, as shown in FIG. 13.

Figure 15:
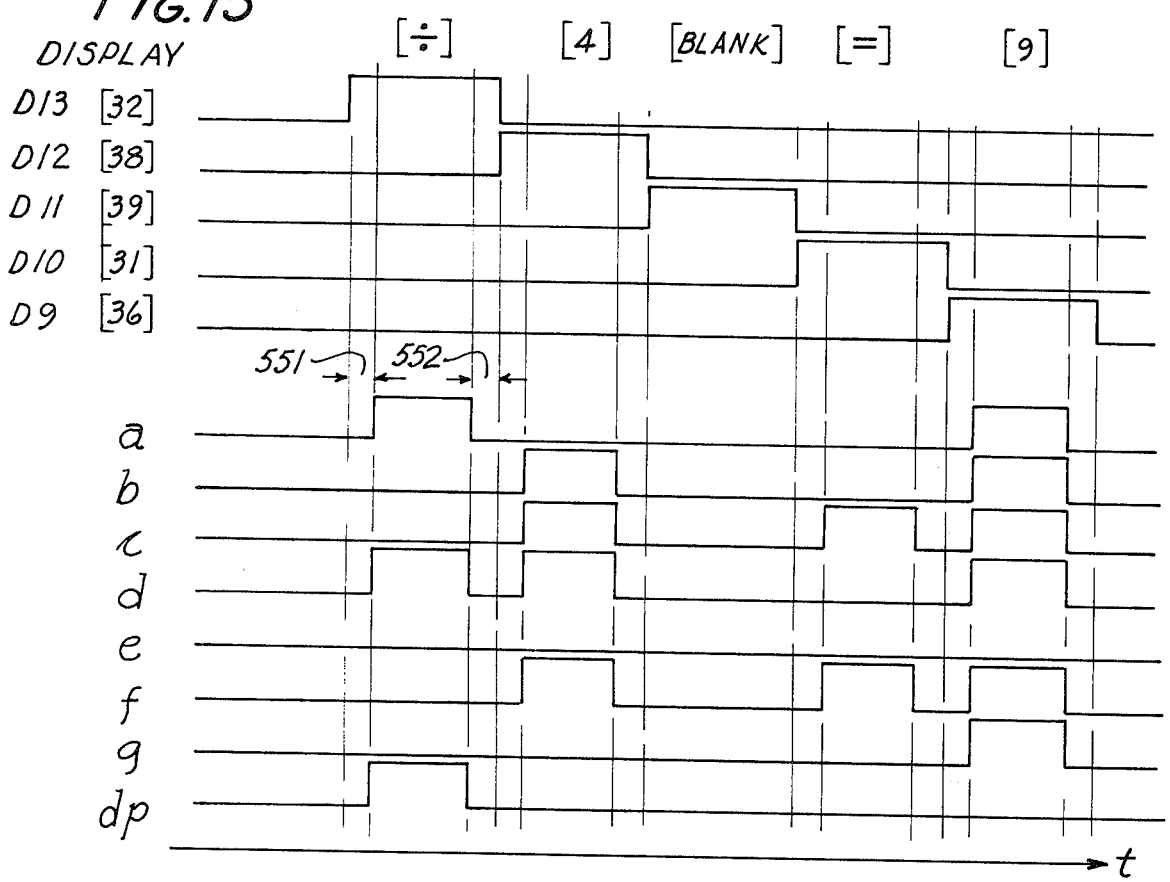
FIG. 15 illustrates waveforms of display driver signals in accordance with a preferred embodiment.

FIG. 15 shows an example of an energization of the display device 294 by illustrating waveforms of the digit driver signals D9 to D13 and of the segment electrode driver signals *a* to *g* and *dp*. By way of example, and with reference to FIG. 1, numerals have been indicated in square brackets adjacent the waveforms D9 to D13 to designate the common electrodes of the digit and arithmetic sign displays which are energized by these waveforms. Similarly, indicia have been indicated in square brackets above the columns of the illustrated waveforms to correlate the illustration of FIG. 15 to corresponding figures shown as being displayed on the panel 15 in FIG. 1.

Two important features, already described above in general terms, can readily be seen from FIG. 15. In particular, there is in the illustrated preferred embodiment a blanking interval, such as shown at 551 between the leading edge of any digit driver pulse D9 to D13 and the leading edge of its corresponding segment driver pulse *a* to *g* and *dp*.

Similarly, there is a blanking interval, such as shown at 552, between the trailing edge of any segment driver pulse and the trailing edge of its corresponding digit driver pulse.

These blanking intervals 551, 552, etc., provide a blanking interval between each energization of a display and a succeeding energization of another display. Unintended energization or ghosting of digit portions can thus be eliminated.

It may thus be broadly said that the second trigger pulses applied to selected segment electrodes *a*, *b*, *c*, etc., are in at least partial time coincidence with first trigger pulses D9 to D13, and that blanking intervals 551, 552, etc., are provided between each application of succeeding pairs of coincidental first and second trigger pulses.

In particular, the illustrated preferred embodiment provides blanking intervals between corresponding beginnings and corresponding ends of the at least partially concidental first and second trigger pulses. More specifically, a first blanking interval 551 is provided between the beginning of a first trigger pulse and the beginning of its corresponding second trigger pulse, and a second blanking interval 552 is provided between the end of the latter second trigger pulse and the end of its corresponding first trigger pulse While this blanking feature may be implemented in various ways within the scope of the subject disclosure and equivalence thereof, the blanking intervals in accordance with the illustrated preferred embodiments are realized by making the segment driver pulses *a* to *g* and *dp* shorter than the digit driver pulses D9 to D13 and by centering the shorter segment driver pulses relative to the digit driver pulses so that there is a blanking interval 551 ahead of, and a blanking interval 552 after, each segment driver pulse. In this manner, the segment driver pulses themselves are spaced from each other, while the digit driver pulses themselves may then follow each other in time sequence without blanking intervals, as shown in FIG. 15.

In the display of mathematical equations, there conventionally have been design limitations, since even conventional forms of blanking were not capable of eliminating ghosting of clustered arithmetic signs altogether. Accordingly, the prior art resorted to such stopgap techniques as limiting the number of displayable arithmetic signs to two (such as + and ×) and to locate these two remaining function displays at different places. This led to an undesirable jumping sign display and either restricted the presentable problems to addition and multiplication or restricted the display of subtraction and division problems to displays of the confusing inverse addition and multiplication functions.

In accordance with the second important feature shown in FIG. 15, the energization of a remote digit display is interposed between the energization of the arithmetic function sign display and any adjacent digit display. This will now be fully disclosed with the aid of FIGS. 1, 10 and 15.

In particular, the digits shown in FIG. 1 and digit displays shown in FIG. 10 are considered divided into adjacent digits or digit displays and remote digits or digit displays. The digits or digit displays 34 and 36 which are located immediately adjacent the arithmetic function sign or sign display are considered adjacent digits. Conversely, digits or digit displays 35, 38 and 39 or, in a broad sense, even the equal sign 31, are considered remote displays, since at least one digit or digit display 34 or 36 is located between the arithmetic function sign or sign display 32 and the positions 31, 35, 38 and 39.

As can now readily be seen in FIG. 15, the energization of the digit display 38 by the digit driver pulse D12 is interposed between the energization of the arithmetic function sign display 32 by the driver pulse D13 and the energization of the spatially adjacent digit display 36 by the digit driver pulse D9.

Another design and utility limiting drawback of prior-art equipment has stemmed from the fact that a simultaneous energization of segments of unequal size by the same trigger pulses conventionally leads to objectionable brightness differences in the resulting display and eventual deterioration and destruction of vital parts of the display device.

As a further important feature, the illustrated preferred embodiment implements what may be termed as a current split technique.

In particular, means for limiting the current flowing to the segment electrodes of the arithmetic function sign display relative to the current flowing to corresponding or interconnected electrodes of the digit displays may be provided. In the preferred embodiment shown in FIG. 10, these current limiting or voltage dividing means take the form of resistors 357, 372, 396 and 400 which, respectively, are connected between the segment electrodes S1, S2, S3 and S4 of the arithmetic function sign display 32 (see FIG. 14) on the one hand and the calculator 271 shown in FIG. 9 or the sources of the segment driver pulses or signals *a*, *c*, *g*, and *dp*, on the other hand.

In practice, this will enable the pulses *a*, *c* and *g* to drive, respectively, the *a*, *c* and *g* segments of the digit displays 34, 35, 36, 38 and 39 and simultaneously the S1, S2, S3 and S4 segment electrodes of the arithmetic function sign display 32 without any objectionable mutual interference, differentiation in brightness or accelerated aging or destruction of the display device.

Moreover, the selective current limiting or voltage dividing feature just described, enables the employment of the same pulse and hardware for the simultaneous energization of digit display segment electrodes and arithmetic function sign display segment electrodes, thereby materially reducing the overall number of required driver pulses and hardware, relative to prior-art systems in which completely separated pulses were employed for the energization of the various segment electrodes of the digit and arithmetic function sign displays.

It will thus be recognized that the illustrated preferred embodiment includes means, such as the resistors 357, 372, etc., for limiting energizing currents for flowing through predetermined segment electrodes S1 to S4 of the arithmetic function sign display 32 relative to energizing currents flowing through digit display segment electrodes $a$, $c$, $g$, etc. The resistors 357, 372, etc. impose between the energizing means or calculator 271 and predetermined arithmetic function sign display electrodes S1 to S4 a greater resistance to energizing current flow to these predetermined electrodes S1 to S4 than between the energizing means 271 and digit display electrodes $a$, $c$, $g$, etc.

The illustrated preferred embodiment applies this principle as among the segment electrodes themselves of the arithmetic sign display 32. In particular, the resistors 358, 372, 396 and 400 may be imposed only between predetermined electrodes, such as the electrodes S1 to S4 of the arithmetic function sign display 32 on the one hand and the energizing source or calculator 271 on the other hand, for limiting energizing currents flowing through the latter electrodes relative to energizing currents flowing through at least another or, in the illustrated preferred embodiment, to as much as three further segment electrodes $b$, $d$, and $e$ of the arithmetic function sign displaya 32. In this manner, the resistors 357, 372, 396 and 400 impose between the energizing means or calculator 271 and the predetermined arithmetic function display electrodes S1 to S4 a greater resistance to energizing current flow to these predetermined electrodes S1 to S4 than between the energizing means or calculator 271 and at least another or, in the illustrated preferred embodiment, as many as three further electrodes $b$, $d$ and $e$ of the arithmetic function sign display 32.

The arithmetic function sign display 32 according to the preferred embodiment shown in FIG. 14 includes electrodes S1 to S4 and $d$ for a plus sign and electrodes $b$ and $e$ for a multiplication sign. The latter electrodes $b$ and $e$ are interdigitated with the electrodes S2 and S3.

The $d$ electrode of the arithmetic function sign display 32 serves the display of a minus sign and the electrode S1 to S4 are combined with that minus sign electrode for presenting a plus sign. It is thus seen that the arithmetic function sign display 32 shown in FIG. 14 includes a cluster of selectively energizable electrodes for alternatively displaying a plus sign, a minus sign, a multiplication sign and a division sign.

Speaking in more specific terms, the arithmetic function sign display 32 shown in FIG. 14 includes a first straight segment electrode $d$ for displaying a minus sign, a pair of essentially V-shaped second and third segment electrodes $b$ and $e$ having apices located adjacent a mid portion of the first segment electrode $d$ and being essentially symmetrically disposed relative to the first segment electrode for displaying a multiplication sign, a pair of fourth and fifth segment electrodes extending at an angle to, and being essentially symmetrically disposed relative to the first segment electrode $d$, this fourth segment electrode being located essentially midway between the legs, and spaced from the apex, of the V-shaped second electrode S1, and the fifth segment electrode S4 being located essentially midway between the legs, and spaced from the apex, of the V-shaped third electrode $e$, a pair of sixth and seventh segment electrodes S2 and S3 aligned with the fourth and fifth electrodes S1 and S4 and essentially symmetrically disposed relative to the first segment electrode $d$, this sixth segment electrode being located between the fourth segment electrode S1 and the apex of the V-shaped second electrode $b$, and the seventh segment electrode S3 being located between the fifth segment electrode S4 and the apex of the V-shaped third electrode $a$. A further electrode 297 is spaced from and common to the first, second, third, fourth, fifth, sixth and seventh segment electrodes S1 to S4, $b$, $d$ and $e$.

Figure 16:
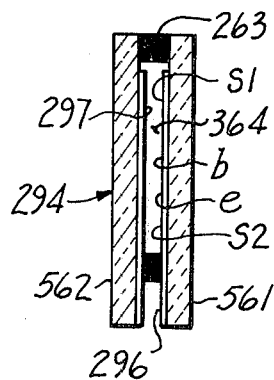
FIG. 16 is a section through a display device shown in FIG. 10.

The electrodes of the arithmetic function sign display 32 are energized as displayed above in connection with FIGS. 9 and 10. As seen in the cross section through the display device 294 shown in FIG. 16, the segment electrodes for the digits and the arithmetic signs may be deposited on a substrate 561 which, for instance, may be a ceramic plate that carries also the above mentioned leads or bus bars for interconnecting corresponding segment electrodes of the digit and arithmetic sign displays.

The common electrode or anode 297 may be deposited on the inside of a glass panel 562 which is spaced from the ceramic plate 561 by spacers 263 which also seal the space between the plates 561 and 562 so that a charge 364 of an ionizable gas may be contained between the segment and common electrodes.

Figure 17:
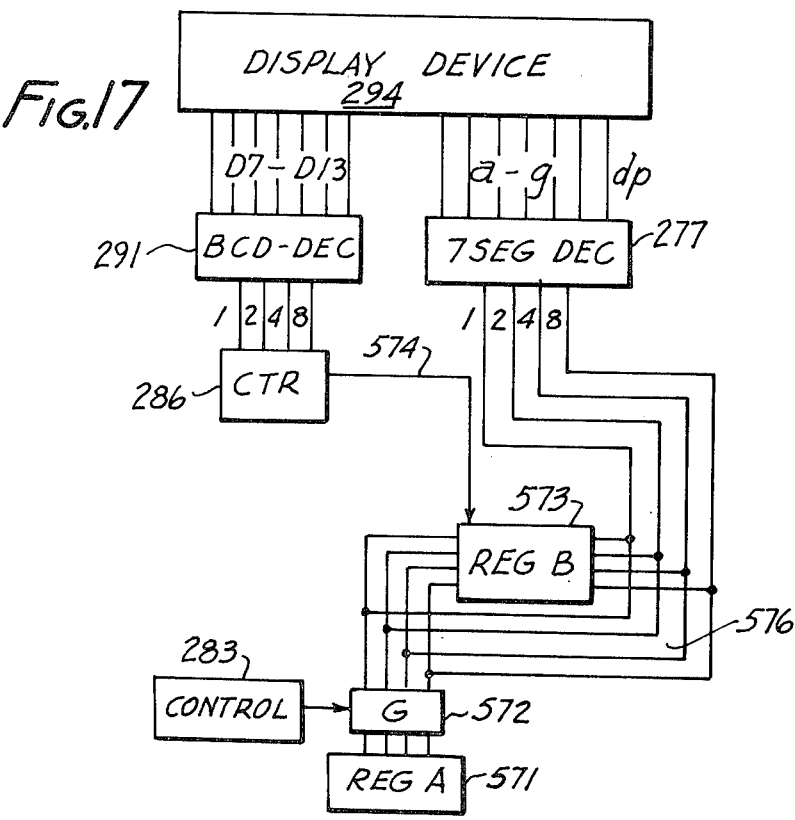
FIG. 17 is a block diagram of a display system that may be employed in the preferred embodiment of FIGS. 9, 10 and 12.

A block diagram of hardware for operating the digit and arithmetic sign display device 294 in the display panel 15 is shown by way of example in FIG. 17. In practice, the components shown in this block diagram may be constituted by components of the calculator 271 shown in FIGS. 9 and 12.

In particular, the display device control and driver equipment of FIG. 17 includes an A register 571 which, for instance, may be contained in the RAM 284 shown in FIG. 12 and operate as a shift register to determine which segments of the display shall be lit in a given operation. The control 283 shown in FIGS. 12 and 17 operates gates 572 for a transfer of the segment display control to a B register 573 which may also be contained in the RAM 284.

Energization of the common electrodes or anodes of the display 294 may be controlled by the digit counter 286 shown in FIGS. 12 and 17. As indicated by a line 574, the counter 286 may also control the operation of the B register 573 for a cycling of segment electrode energization information via lines 576 from the outputs to the inputs of the B register 573. The counter 286 operates through the binary to decimal converter 291 to energize the common display electrodes or anodes as partially indicated in the upper part of FIG. 15. Similarly, the B register 573 operates through the segment decoder 277 to energize the segment electrodes or cathodes in the manner partially illustrated in the lower part of FIG. 15.

Figure 18:
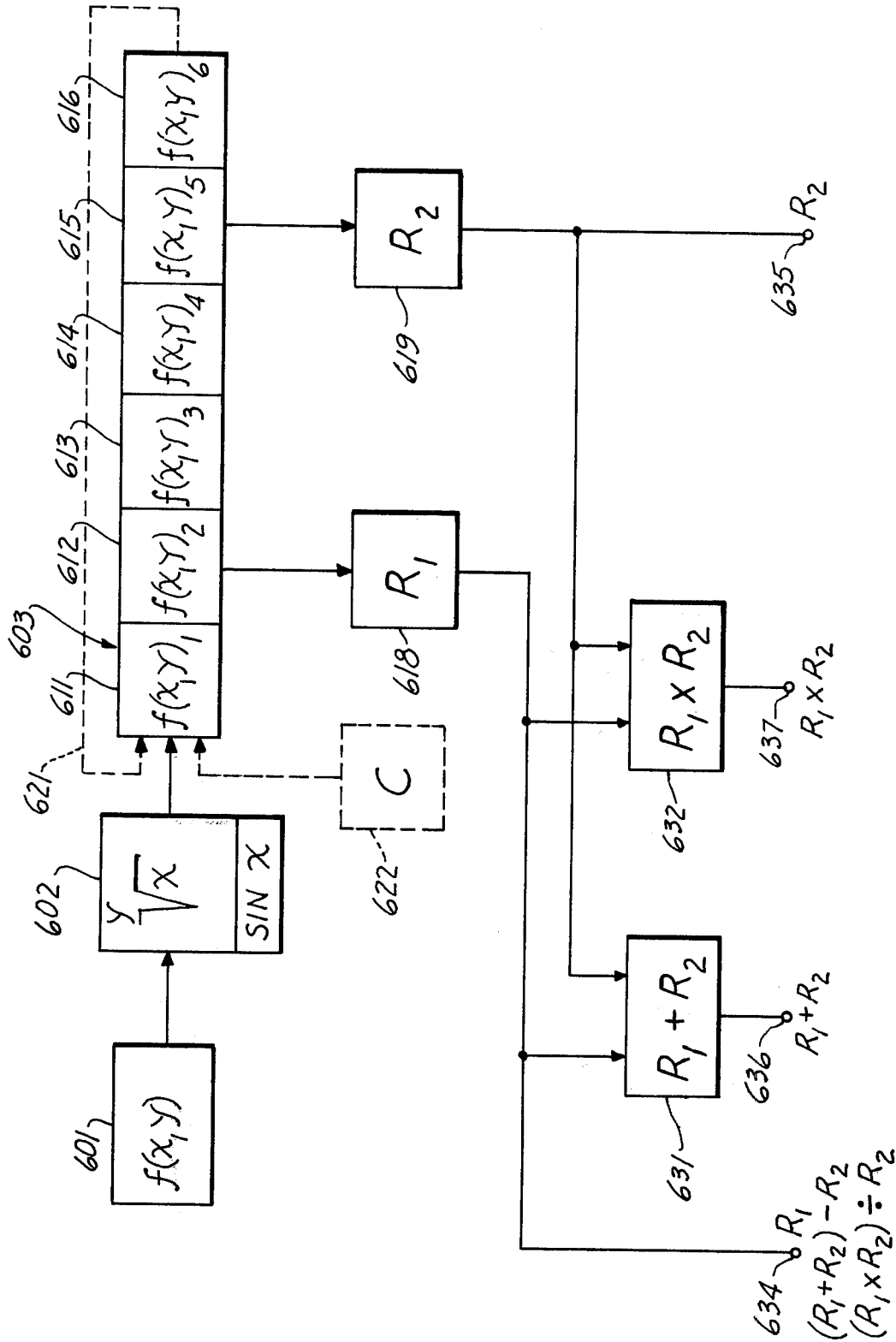
FIG. 18 is a block diagram of equipment according to a preferred embodiment which may be employed in the teaching apparatus of the subject invention.

Two further important features of the illustrated preferred embodiment are shown in FIG. 18. In particular, the upper part of FIG. 18 presently to be described concerns the generation of random numbers, such as the random numbers $R_1$ and $R_2$, described above in connection with FIGS. 3, 4 and 5, with emphasis on the blocks 154 and 155 shown in FIG. 4.

The lower part of FIG. 18 concerns the calculation of various combinations of the random numbers as described above with reference to FIG. 6.

The apparatus of FIG. 18 includes equipment 601 for providing a first number. This number may, but need not necessarily be provided randomly. For instance, the equipment 601 may be a conventional random number generator. By way of further example, and as herein disclosed with reference to FIG. 11, the number generating equipment 601 may provide the mentioned first number on the basis of the time difference between the power on condition (circuit 454 in FIG. 11) and the instant of a first depression of a key, such as the key 24 or 25 shown in FIG. 1. Reference may in this connection also be had to the above mentioned, herein incorporated Meyer et al patent.

The number provided by the equipment 601 is applied to a mathematical unit 602 which, for instance, may be part of the arithmetic unit 273 shown in FIG. 12. The function of the unit 602 is to subject the first number provided by the generator 601 to a predetermined mathematical operation in order to generate a second number having a plurality of digit places. The mathematical function selected for performance by the unit 602 is basically any function which typically yields digit places occupied by a wide variety of integers. With the advent of microcomputers and other modern calculators, there have become available numerous mathematical function performing circuits and units suitable for present purposes. For instance, the unit 602 may be an electronic device for performing a square root, cubic root or other root function.

Alternatively, the unit 602 may be a conventional electronic device for performing a logarithmic, trigonometric or other transcendental function.

The second, multi-digit number provided by the unit 602 is applied to a register 603 which stores the various digit places in stages or positions 611 to 616. By way of example, the register 603 may be part of the RAM 284 shown in FIG. 12.

Gates 618 and 619 are connected to the register 613 to derive one of the above mentioned numbers $R_1$ and $R_2$ from a first digit place of the second number, and the other of the latter two numbers from a different second digit place of that second number.

In the illustrated preferred embodiment shown in FIG. 18, the gate or other suitable device 618 derives the digit $R_1$ from the second place 612 of the second number in the shift register 603. On the other hand, the gate or other suitable device 619 derives the number $R_2$ from the fifth digit place of the mentioned second number.

Assuming for the moment that the mathematical unit 602 is a square root calculating device ($y = 2$) and the number generated at 601 is equal to 2 ($x = 2$), then we find that the above mentioned second number stored in the register 603 is equal to 1.414214. In consequence, the numbers $R_1$ and $R_2$ are equal to 4 and 2, respectively.

It will thus be noted that the numbers $R_1$ and $R_2$ are significantly different from each other even where the second number, as in the example just given, has several identical numbers in the different digit places. The wide variety of numbers that can be produced by the illustrated preferred embodiment becomes readily apparent from a consultation of square root, cubic root, exponential, logarithmic, trigonometric and other mathematical function tables.

Moreover, the above mentioned second number provided by the mathematical unit 602 can be circulated or shifted around in the register 602 as indicated by the dotted line 621. This shifting can be effected under a randomly operating control 622 so that further randomization of the numbers $R_1$ and $R_2$ is readily effected in a simple manner. The random control 622 may be similar or identical to the random control employed in generator 601 for providing the initial number. In fact, once a second number has been generated by the unit 602, further numbers may be derived from the register 603 for the purpose of energizing the mathematic unit 602 preparatory to the energization of further random type numbers. For instance, either of the numbers $R_1$ and $R_2$ may, if desired, be employed as input to the mathematical unit 602.

The numbers $R_1$ and $R_2$ derived at 618 and 619 in FIG. 18 may be presented in the context of arithmetic problems as mentioned above. In particular, and as extensively disclosed above in connection with FIG. 6, the derived random numbers $R_1$ and $R_2$ may be processed to provide arithmetic addition, subtraction, multiplication and division problems.

By way of example, FIG. 18 shows an adder 631 and a multiplier 632 for adding and multiplying the numbers $R_1$ and $R_2$, respectively. Such adders and multiplyers are conventional devices and, for instance, may form part of the arithmetic unit 273 shown in FIG. 12.

If the apparatus is set for addition (see keys 23) in FIGS. 1 and 8, then the addends $R_1$ and $R_2$ appear at the terminal 634 and 635 for display on the panel 15 in the above mentioned manner (see FIGS. 1 and 10), while the sum or correct answer desired of the pupil appears at the terminal 636 for subsequent display at the digit positions 38 and 39, also as disclosed above.

In the case of a multiplication problem, the factors $R_1$ and $R_2$ appear at the terminals 634 and 635 while the product or correct answer appears at a terminal 637.

In the case of a subtraction problem, the minuend appears at the terminal 636 and the subtrahend at the terminal 635. The difference or correct answer then appears automatically at the terminal 634, without any actual subtraction by the illustrated equipment being even necessary.

In the case of a division problem, the dividend appears at the terminal 637 and the divisor at the terminal 635. The quotient or correct answer then appears automatically at the terminal 634 without any actual division function being required of the illustrated equipment.

The subject matter of this disclosure also lends itself readily to the adjustment of different difficulty levels (see switch 41 in FIGS. 1 and 8). For instance, the programmed calculator 271 may provide as $R_1$ the number 1 when the adjusted difficulty level is from 0–3 and the second digit place 612 shown in FIG. 18 is occupied by a number from 1–3. On the other hand, $R_1$ may be 2 if the difficulty level is again from 1–3 but the second digit place 612 is occupied by a number from 4–6. Variations of this principle provide numbers which are suitable for any difficulty level.

Figure 11:
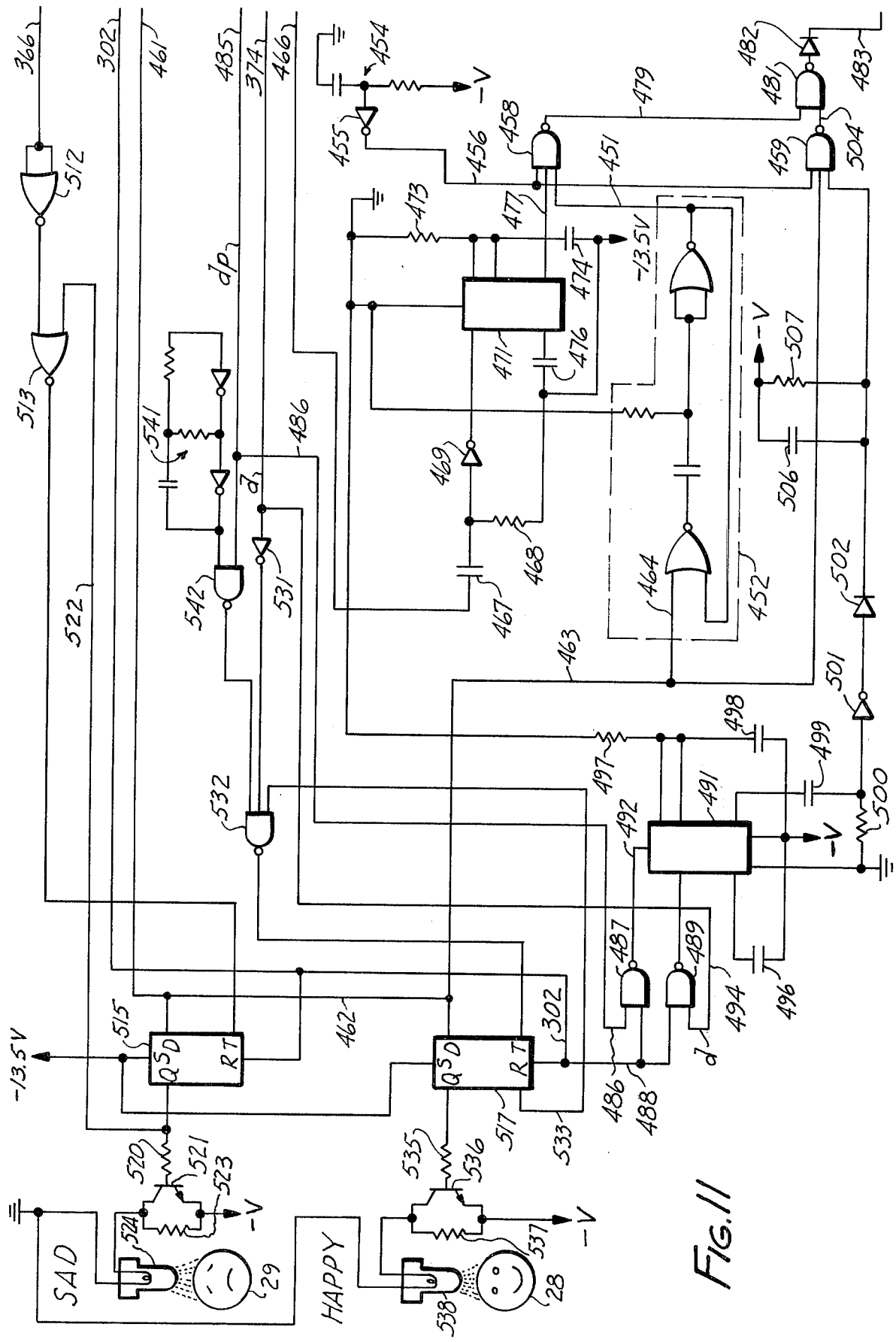

In the preferred embodiment shown in FIG. 11, the signals D1, c, d, and dp from the calculator 271 are decoded to control the happy and sad face displays 28 and 29, shown in FIG. 1. Similarly, the pulses D2, *d* and *dp* from the calculator 271 are decoded in FIG. 11 to control the above mentioned timing which gives the pupil a certain amount of time, such as 8 or 10 seconds, in which to supply the second digit in a two-digit answer.

To elucidate the function of the preferred embodiment shown in FIG. 11, the following truth table is herewith supplied.

TABLE I

| ITEM | CONDITIONS | D1 | D2 | D11 | c | d | dp | 451 |
|---|---|---|---|---|---|---|---|---|
| 1 | Sad face | 1 | 0 | 0 | 1 | 0 | 0 | 0 |
| 2 | Happy Face | 1 | 0 | 0 | 0 | 1 | 0 | 0 |
| 3 | Happy Face w/Blinking | 1 | 0 | 0 | 0 | 1 | 1 | 0 |
| 4 | 8 Sec. Set | 0 | 1 | 0 | 0 | 1 | 0 | 0 |
|   | Delay Reset | 0 | 1 | 0 | 0 | 0 | 1 | 0 |
| 5 | Random Timing | 0 | 0 | 1 | 0 | 0 | 0 | 1 |

The first column of the truth table shows the item conditions presently to be described. The next three columns indicate the states of the above mentioned signals D1, D2 and D11. The subsequent three columns indicate the states of the above mentioned signals $c$, $d$, and $dp$ (see FIGS. 9 and 12). The last column of TABLE I indicates the state of the output 451 of a one-shot multivibrator 452 shown in FIG. 11 and more fully described below.

As can be seen from TABLE I, the display of a sad face 29 requires the D1 signal in combination with the $c$ signal. Conversely, simultaneous presence of the D1 and $d$ signals produces a happy face display 28. For a blinking happy face, indicating a 100 percent perfect score for the particular problem set, the signals D1, $d$ and $dp$ have to be simultaneously present.

The above mentioned time delay, which affords the pupil an opportunity to supply the second digit of a two-digit answer, is set by the simultaneous presence of the D2 and $d$ signals. Similarly, the simultaneous presence of the D2 and $dp$ signals will reset that time delay.

As further apparent from TABLE I, simultaneous presence of the D11 signals and a gate signal provided by the multivibrator 452 at the output 451 will initiate the random timing, resulting in a random number generation according to block 113 shown in, and discussed above in connection with, FIG. 3.

The functions illustrated by TABLE I will now be explained in terms of circuitry with the aid of FIG. 11.

In particular, the power on condition illustrated by the circle 112 in FIG. 3 is realized with the aid of an RC network 454 shown in FIG. 11. The capacitor of the RC network 454 is initially discharged and will be charged upon application of the supply power to the illustrated equipment. Upon charging of the capacitor, an inverter 455 will apply a high potential to a lead 456 which, in turn, will enable a pair of NAND gates 458 and 459.

As seen in FIGS. 9 and 11, leads 461, 462 and 463 apply the D1 output of the calculator 271 to a input 464 of the multivibrator 452 and also to an input of the NAND gate 459. The multivibrator 452, in turn, generates the above mentioned gate pulse at its output 451.

As apparent from FIGS. 9, 10 and 11, leads 341 and 466 apply the D11 output of the calculator 271 to a capacitor 467 of an edge detector including also a resistor 468. In response to the detected leading edge of the pulse D11, an inverter 469 triggers a digital timer 471. By way of example, the timer 471 may be of the type 556 of Signetics, as described, for instance, on pages 6–67 to 6–70 of the Linear Integrated Circuits Application Book by Signetics Corporation.

The duration of the timer pulse provided by the component 471 is determined by the parameters of an RC network including a resistor 473 and a capacitor 474 having their mutual junction connected to the discharge and threshold inputs of the timer 471. A capacitor 476 applies a voltage to the control voltage input of the timer 471 for the purpose of noise reduction. A lead 477 applies the output pulse of the timer 471 to an input of the NAND gate 458. The resulting output pulse of the NAND gate 458 is applied by a lead 479 to an input of a NAND element 481 operating as on OR element.

The resulting output of the element 481 is applied via a diode 482 and a lead 483 to the K3 lead and input of the calculator 271, as may be seen in FIGS. 8, 9 and 11. In consequence, the program counter 274 shown in FIG. 12 will be randomized for a random number generation.

As seen in FIGS. 9 and 11, leads 397, 485 and 486 apply the *dp* output of the calculator 271 to an input of a NAND element 487. Leads 302 and 488 apply the D2 output of the calculator 271 to the other input of the NAND element 487 and to a further input of a NAND element 489. In consequence, a timer 491, which may be of the same type as the above mentioned timer 471, is reset via a lead 492.

As further seen in FIGS. 9 and 11, leads 374, 474 and 494 apply the *d* output of the calculator 271 to the other input of the NAND element 489, whereby the timer 491 is triggered. A capacitor 496 performs a noise reducing function on the timer 491, and an RC network including a resistor 497 and a capacitor 498 determine the time constant of the timer 491.

The output of the timer 491 is differentiated by a capacitor 499 and a resistor 500. The capacitor 499 and resistor 500 cooperate with an inverter 501 and a diode 502 in applying a constant area pulse to the third input of the NAND gate 459.

The gate applies the above mentioned D1 pulses via a lead 405, element 481, diode 482 and lead 483 to the K3 line and input of the calculator 271.

In line with the above mentioned TABLE I energization of the K3 input in response to the D11 signals and the 451 output signals will initiate random number generation. On the other hand, energization of the K3 input in response to the D2 and *d* signals will set the above mentioned timing of the provision of the second digit relative to the first digit by the pupil in a two-digit answer.

It may be noted at this juncture that the gate 459, the inverter 501, the diode 502, a capacitor 506 and a resistor 507 form a one-shot multivibrator.

As seen in FIGS. 9 and 11, the lead 366 applies the *c* output of the calculator 271 to a NOR element 512 operated as an inverter. The inverter 512 controls a NOR element 513 which, in turn, triggers a bistable multivibrator 515. The element 515 may be a flip-flop type CD4013A of the type described on page 13 of the RCA Solid State '74 Data Book.

The flip-flop 515, as well as a flip-flop 517 are reset by the above mentioned D2 output of the calculator 271 via the lead 302. The data present inputs of the flip-flops 515 and 517 are energized via leads 461 and 462 by the D1 output of the calculator 271.

The Q output of the flip-flop 515 is applied via a resistor 520 to the base of a transistor 521 and via a lead 522 to the second input of the NOR element 513 to disable the flip-flop 515 via its trigger input.

Application of the Q output of the flip-flop 515 to the base of the transistor 521 will establish a parallel path to a resistor 523.

The resistor 523 is dimensioned to permit a current to flow through an incandescent lamp 524 in order to preheat the same without causing any significant emission of light therefrom at that time. On the other hand, when the transistor 521 is energized to shunt the resistor 523, the incandescent lamp 524 will light up and illuminate an appropriate diapositive 29 in order to project a sad face on the panel 27 shown in FIG. 1.

As seen in FIGS. 9 and 11, the above mentioned lead 374 applies the $d$ output of the calculator 271 to an inverter 531 which, in turn, controls an input of a NAND element 532 which, in turn, triggers the flip-flop 517. A lead 533 applies the $\bar{Q}$ output of the flip-flop 517 to the NAND element 532 to disable the same at that time.

The Q output of the flip-flop 517 is applied via a resistor 535 to the base of a transistor 536. The transistor 536 shunts a resistor 537 in order to cause an incandescent lamp 538 to project light through an appropriate diapositive 28 to provide a happy face on the display panel 27 shown in FIG. 1. Without the shunt provided by the transistor 536, the current flowing through the resistor 537 will only be sufficient to preheat the incandescent lamp 538, but will not be able to light it.

The happy face 28 will remain lit until the go key 24 is depressed. On the other hand, the happy face 28 will be caused to flash or blink as mentioned above in response to a perfect score at the end of any set of problems.

To this end, a free-running astable multivibrator 541 is connected to an input of a NAND element 542, the other input of which is connected to the lead 485 to receive the $dp$ signal mentioned above. By way of example, the multivibrator 541 may be dimensioned to provide pulses of one-half second duration which, acting through the elements 517, 532, 536 and 542, will cause the lamp 538 and thus the happy face 28 to flash or blink on the display panel 27, thereby rewarding the pupil for a perfect score.

In practice, the $dp$ pulse mentioned throughout this disclosure may be the decimal point pulse of the calculator 371. By way of example, this decimal point or $dp$ pulse may be coincidental with the pulse D13 as shown in FIG. 13.

I claim:

1. An apparatus for deriving two output numbers, comprising in combination:
   means for providing a first number;
   means connected to said first number providing means for providing a second number having a plurality of digit places, by subjecting said first number to a predetermined mathematical operation;
   means connected to said second number providing means for deriving one of said two output numbers from a first digit place of said second number, and the other of said two output numbers from a different second digit place of said second number.

2. An apparatus as claimed in claim 1, wherein:
   said second number providing means include means for subjecting said first number to a predetermined root function.

3. An apparatus as claimed in claim 1, wherein:
   said second number providing means include means for subjecting said second number to a predetermined transcendental function.

4. An apparatus as claimed in claim 1, wherein:
   said first number providing means include means for providing said first number randomly.

5. In apparatus for generating mathematical problems, the improvement comprising in combination:
   means for providing a first number;
   means connected to said first number providing means for providing a second number having a plurality of digit places, by subjecting said first number to a predetermined mathematical operation;
   means connected to said second number providing means for deriving one of two output numbers from a first digit place of said second number, and the other of said two output numbers from a different second digit place of said second number; and
   means connected to said deriving means for presenting a mathematical problem including said one and said other derived output numbers.

6. An apparatus as claimed in claim 5, wherein:
   said second number providing means include means for subjecting said first number to a predetermined root function.

7. An apparatus as claimed in claim 5, wherein:
   said second number providing means include means for subjecting said second number to a predetermined transcendental function.

8. An apparatus as claimed in claim 5, wherein:
   said first number providing means include means for providing said first number randomly.

* * * * *